United States Patent
Guo et al.

(10) Patent No.: US 10,872,087 B2
(45) Date of Patent: Dec. 22, 2020

(54) SYSTEMS AND METHODS FOR STOCHASTIC GENERATIVE HASHING

(71) Applicant: Google LLC, Mountain View, CA (US)

(72) Inventors: Ruiqi Guo, Elmhurst, NY (US); Bo Dai, Mountain View, CA (US); Sanjiv Kumar, Jericho, NY (US)

(73) Assignee: Google LLC, Mountain View, CA (US)

( * ) Notice: Subject to any disclaimer, the term of this patent is extended or adjusted under 35 U.S.C. 154(b) by 233 days.

(21) Appl. No.: 15/783,685

(22) Filed: Oct. 13, 2017

(65) Prior Publication Data
US 2019/0114343 A1 Apr. 18, 2019

(51) Int. Cl.
*G06N 20/00* (2019.01)
*G06F 16/22* (2019.01)
*G06F 16/2455* (2019.01)
*G06F 16/27* (2019.01)

(52) U.S. Cl.
CPC .... *G06F 16/24554* (2019.01); *G06F 16/2255* (2019.01); *G06F 16/278* (2019.01); *G06N 20/00* (2019.01)

(58) Field of Classification Search
CPC .................. G06F 16/24554; G06F 16/2255
See application file for complete search history.

(56) References Cited

U.S. PATENT DOCUMENTS

| 2014/0067735 | A1* | 3/2014 | Yu | G06N 3/02 706/20 |
| 2014/0095204 | A1* | 4/2014 | Fung | G06F 19/00 705/3 |
| 2015/0169633 | A1* | 6/2015 | Yee | G06F 16/51 707/723 |
| 2015/0248458 | A1* | 9/2015 | Sakamoto | G06F 21/60 707/719 |

(Continued)

OTHER PUBLICATIONS

Jingkuan Song, "Binary Generative Adversarial Networks for Image Retrieval", Jul. 2017, ACM Conference 2017, Washington D.C. USA (Year: 2017).*

(Continued)

*Primary Examiner* — Hosain T Alam
*Assistant Examiner* — Anthony G Gemignani
(74) *Attorney, Agent, or Firm* — Dority & Manning, P.A.

(57) ABSTRACT

The present disclosure provides systems and methods that perform stochastic generative hashing. According to one example aspect, a machine-learned hashing model that generates a binary hash for an input can be trained in conjunction with a machine-learned generative model that reconstructs the input from the binary hash. The present disclosure provides a novel generative approach to learn hash functions through Minimum Description Length principle such that the learned hash codes maximally compress the dataset. According to another example aspect, the present disclosure provides an efficient learning algorithm based on the stochastic distributional gradient, which avoids the notorious (Continued)

difficulty caused by binary output constraints, to jointly optimize the parameters of the hashing model and the associated generative model. The present disclosure also provides extensive experiments which show that the systems and methods described herein achieve better retrieval results than the existing state-of-the-art methods.

19 Claims, 13 Drawing Sheets

(56) References Cited

U.S. PATENT DOCUMENTS

| 2015/0254566 | A1* | 9/2015 | Chandramouli | G06N 20/00 706/11 |
|---|---|---|---|---|
| 2016/0219277 | A1* | 7/2016 | Ozerov | H04N 19/124 |
| 2017/0142479 | A1* | 5/2017 | Babbar | G06F 16/71 |

OTHER PUBLICATIONS

Babenko et al., "Additive Quantization for Extreme Vector Compression", In Proceedings of the Institute of Electrical and Electronics Engineers Conference on Computer Vision and Pattern Recognition, Columbus, Ohio, Jun. 23-28, 2014, 8 pages.
Bengio et al., "Estimating or Propagating Gradients through Stochastic Neurons for Conditional Computation", arXiv:1308.3432v1, Aug. 15, 2013, 12 pages.
Bottou et al., "Optimization Methods for Large-Scale Machine Learning", arXiv:1606.04838v2, Jun. 2, 2017, 95 pages.
Carreira-Pespinan et al.. "Hashing with Binary Autoencoders", In Proceedings of the Institute of Electrical and Electronics Engineers Conference on Computer Vision and Pattern Recognition, Boston, Massachusetts, Jun. 7-12, 2015, pp. 557-566.
Charikar, "Similarity Estimation Techniques from Rounding Algorithms", Proceedings of the Thirty-Fourth Annual Association for Computing Machinery Symposium on Theory of Computing, Montreal, Quebec, Canada, May 19-21, 2002, 9 pages.
Dai et al., "Provable Bayesian Inference via Particle Mirror Descent", In Proceedings of the 19$^{th}$ International Conference on Artificial Intelligence and Statistics, Cadiz, Spain, May 9-11, 2016, pp. 985-994.
Douze et al., "Polysemous Codes", arXiv:1609.01882v2, In European Conference on Computer Vision, Amsterdam, The Netherlands, Oct. 10, 2016, 18 pages.
Ghadimi et al., "Stochastic First-And Zeroth-Order Methods for Nonconvex Stochastic Programming, Society for Industrial and Applied Mathematics Journal on Optimization", arXiv:1309.5549v1, Sep. 22, 2013, 25 pages.
Gionis et al., "Similarity Search in High Dimensions via Hashing", In Very Large Data Bases, vol. 99, Edinburgh, Scotland, Sep. 7-10, 1999, pp. 518-529.
Gong et al., "Iterative Quantization: A Procrustean Approach to Learning Binary Codes", In Proceedings of the Institute of Electrical and Electronics Engineers Conference on Computer Vision and Pattern Recognition, Colorado Springs, Colorado, Jun. 20-25, 2011, pp. 817-824.
Gong et al., "Angular Quantization-based Binary Codes for Fast Similarity Search", In Advances in Neural Information Processing Systems, Lake Tahoe, Nevada, Dec. 3-8, 2012, 9 pages.
Gong et al., "Learning Binary Codes for High-Dimensional Data Using Bilinear Projections", In Proceedings of the Institute of Electrical and. Electronics Engineers Conference on Computer Vision and Pattern Recognition, Portland, Oregon, Jun. 23-28, 2013, pp. 484-491.
Gregor et al., "Deep Autoregressive Networks", In Proceedings of the 31$^{st}$ International Conference on Machine Learning, Beijing, China, Jun. 21-26, 2014, 9 pages.
Grubb, "Distributions and Operators", vol. 252, Springer Science & Business Media, New York, Oct. 10, 2008, 3 pages.
Gu et al., "Unbiased Backpropagation for Stochastic Neural Networks", arXiv:1511.05176v3, Feb. 25, 2016, 12 pages.
Guo et al., "Quantization Based Fast Inner Product Search", 19$^{th}$ International Conference on Artificial Intelligence and Statistics, Cadiz, Spain, May 7-11, 2016, pp. 482-490.
He et al., "K-means Hashing: An Affinity-Preserving Quantization Method for Learning Binary Compact Codes", In Proceedings of the Institute of Electrical and Electronics Engineers Conference on Computer Vision and Pattern Recognition, Portland, Oregon, Jun. 23-28, 2013, pp. 2938-2945.
Heo et al., "Spherical Hashing", In Proceedings of the Institute of Electrical and Electronics Engineers Conference on Computer Vision and Pattern Recognition, Providence, Rhode Island, Jun. 16-21, 2012, 8 pages.
Hinton et al., "Keeping Neural Networks Simple by Minimizing the Description Length of the Weights", In Proceedings of the Sixth Annual Conference on Computational Learning Theory, Santa Cruz, California, Jul. 26-28, 1993, pp. 5-13.
Hinton et al., "Autoencoders, Minimum Description Length and Helmholtz Free Energy", In Advances in Neural Information Processing Systems, Denver, Colorado, Nov. 28-Dec. 1, 1994, pp. 3-10.
Huang et al., "Online Hashing", In the Proceedings of the Twenty-Third International Joint Conference on Artificial Intelligence, Beijing, China, Aug. 3-9, 2013, pp. 1422-1428.
Indyk et al., "Approximate Nearest Neighbors: Towards Removing the Curse of Dimensionality", In Proceedings of the Thirtieth Annual Association for Computing Machinery Symposium on Theory of Computing, Dallas, Texas, May 24-26, 1998, pp. 604-613.
Jegou et al., "Product Quantization for Nearest Neighbor Search", Institute of Electrical and Electronics Engineers Transactions on Pattern Analysis and Machine Intelligence, vol. 33, No. 1, Mar. 23, 2011, 15 pages.
Jiang et al., "Scalable Graph Hashing with Feature Transformation", In Twenty-Fourth International Joint Conference on Artificial Intelligence, Buenos Aries, Argentina, Jul. 25-31, 2015, pp. 2248-2254.
Kingma et al., "Adam: A Method for Stochastic Optimization", arXiv:1412.6980v9, Jan. 30, 2017, 15 pages.
Kingma et al., "Auto-Encoding Variational Bayes", arXiv:1312.6114v10, May 1, 2014, 14 pages.
Krizhevsky, "Learning Multiple Layers of Features from Tiny Images", Toronto, Canada, Apr. 8, 2009, 60 pages.
Leng et al., "Online Sketching Hashing", In 2015 Institute of Electrical and Electronics Engineers Conference on Computer Vision and Pattern Recognition, Boston, Massachusetts, Jun. 7-12, 2015, pp. 2503-2511.
Liu et al., "Hashing with Graphs", In Proceedings of the 28$^{th}$ International Conference on Machine Learning, Bellevue, Washington, Jun. 28-Jul. 2, 2011, 8 pages.
Liu et al., "Discrete Graph Hashing", In Advances in Neural Information Processing Systems, Montreal, Canada, Dec. 8-13, 2014, 9 pages.
Mnih et al., "Neural Variational inference and Learning in Belief Networks", arXiv:1402.0030v2, Jun. 4, 2014, 10 pages.
Nemirovski et al., "Robust Stochastic Approximation Approach to Stochastic Programming", Society for Industrial and Applied Mathematics Journal on Optimization, vol. 19. No. 4, 2010, pp. 1574-1609.
Raiko et al., "Techniques for Learning Binary Stochastic Feedforward Neural Networks", arXiv:1406.29889v3, Apr. 9, 2015, 10 pages.
Ranzato et al., "Modeling Pixel Means and Covariances Using Factorized. Third-Order Boltzmann Machines", Institute of Electrical and Electronics Engineers Conference on Computer Vision and Pattern Recognition, San Francisco, California, Jun. 13-18, 2010, 8 pages.
Shen et al., "Learning Binary Codes for Maximum Inner Product Search", Institute of Electrical and Electronics Engineers Conference on Computer Vision, Chile, Dec. 7-13, 2015, pp. 4148-4156.
Wang et al., "Hashing for Similarity Search: A Survey", arXiv:1408.2927v1, Aug. 13, 2014, 29 pages.
Wang et al., "Semi-Supervised Hashing for Scalable Image Retrieval", In Computer Vision and Pattern Recognition, San Francisco, California, 2010, 8 pages.

(56) References Cited

OTHER PUBLICATIONS

Weiss et al., "Spectral Hashing", In Advances in Neural Information Processing Systems, Vancouver, British Columbia, Canada, Dec. 7-10, 2009, 8 pages.
Williams, "Bayesian Conditionalisation and the Principle of Minimum Information", British Journal for the Philosophy of Science, vol. 31, No. 2, 1980, pp. 131-144.
Yu. et al., "Circulant Binary Embedding", arXiv: 1405.3162v1, May 13, 2014, 9 pages.
Zellner, "Optimal Information Processing and Baye's Theorem", The American Statistician, vol. 42, No. 4, Nov. 1988, pp. 278-280.
Zhang et al., "Supervised Hashing with Latent Factor Models", In Proceedings of the $37^{th}$ International Association for Computer Machinery Special Interest Group on Information Retrieval Conference on Research and Development in Information Retrieval, Australia, Jul. 6-11, 2014, 10 pages.
Zhang et al., "Composite Quantization for Approximate Nearest Neighbor Search", In Proceedings of the $31^{st}$ International Conference on Machine Learning, Beijing, China, Jun. 21-26, 2014, 9 pages.
Zhu et al., "Deep Hashing Network for Efficient Similarity Retrieval", In Thirtieth Association for the Advancement of Artificial Intelligence Conference on Artificial Intelligence, Phoenix, Arizona, Feb. 12-17, 2016, pp. 2415-2421.

\* cited by examiner

SYSTEMS AND METHODS FOR STOCHASTIC GENERATIVE HASHING

FIELD

The present disclosure relates generally to machine-learning. More particularly, the present disclosure relates to systems and methods that perform stochastic generative hashing.

BACKGROUND

Search for similar items in web-scale datasets is a fundamental step in a number of applications, especially in image, sound, and document retrieval. Formally, given a reference dataset $X=\{x_i\}_{i=1}^{N}$ with $x \in X \subset \mathbb{R}^d$, one task is to retrieve similar and/or relevant items from X for a given query y according to some similarity measure $sim(x,y)$. When the negative Euclidean distance is used, e.g., $sim(x,y)=+\|x-y\|_2$, this corresponds to an $L_2$ Nearest Neighbor Search (L2NNS) problem; when the inner product is used, e.g., $sim(x,y)=x^T y$, it becomes a Maximum Inner Product Search (MIPS) problem.

Brute-force linear search is expensive for large datasets. To alleviate the time and storage bottlenecks, two research directions have been studied extensively: (1) partition the dataset so that only a subset of data points is searched; (2) represent the data as codes so that similarity computation can be carried out more efficiently. The former often resorts to search-tree or bucket-based lookup; while the latter relies on binary hashing or quantization. These two groups of techniques are orthogonal and are typically employed together in practice.

SUMMARY

Aspects and advantages of embodiments of the present disclosure will be set forth in part in the following description, or can be learned from the description, or can be learned through practice of the embodiments.

One example aspect of the present disclosure is directed to a computer system. The computer system includes a machine-learned hashing model configured to receive an input and, in response, output a binary hash for the input. The binary hash includes a binary value for each of a plurality of binary variables. The computer system includes a machine-learned generative model configured to receive the binary hash and, in response, output a reconstruction of the input. The computer system includes one or more processors. The computer system includes one or more non-transitory computer-readable media that collectively store instructions that, when executed by the one or more processors, cause the computer system to perform operations. The operations include obtaining the input. The operations include inputting the input into the machine-learned hashing model to receive the binary hash for the input. The operations include inputting the binary hash into the machine-learned generative model to receive the reconstruction of the input. The operations include evaluating an objective function based on at least one of the binary hash and the reconstruction of the input. The operations include training at least the machine-learned hashing model based at least in part on the objective function.

Another example aspect of the present disclosure is directed to computer-implemented method. The method includes obtaining, by one or more computing devices, an input. The method includes inputting, by the one or more computing devices, the input into a machine-learned hashing mode. The method includes receiving, by the one or more computing devices, a binary hash for the input as an output of the machine-learned hashing model. The method includes inputting, by the one or more computing devices, the binary hash into a machine-learned generative model. The method includes receiving, by the one or more computing devices, a reconstruction of the input as an output of the machine-learned generative model. The method includes evaluating, by the one or more computing devices, an objective function based on at least one of the binary hash and the reconstruction of the input to obtain an objective value. The method includes adjusting, by the one or more computing devices, one or more parameters of the machine-learned hashing model to improve the objective value.

Another example aspect of the present disclosure is directed to a computer system. The computing system includes a machine-learned hashing model configured to receive an input and, in response, output a binary hash for the input. The binary hash includes a binary value for each of a plurality of binary variables. The machine-learned hashing model has been trained based at least in part on an objective function that evaluates the binary hash or a reconstruction of the input provided by a machine-learned generative model in response to receipt of the binary hash. The objective function includes a plurality of stochastic neurons that reparameterize the plurality of binary variables. The computing system includes one or more processors. The computing system includes a database that stores item binary hashes for a plurality of items. The computing system includes one or more non-transitory computer-readable media that collectively store instructions that, when executed by the one or more processors, cause the computer system to perform operations. The operations include obtaining a query. The operations include inputting the query into the machine-learned hashing model. The operations include receiving a query binary hash as an output of the machine-learned hashing model. The operations include identifying one or more similar items from the plurality of items based at least on part on a comparison of the query binary hash to one or more of the item binary hashes.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

1. Introduction and Overview

Figure 1A:
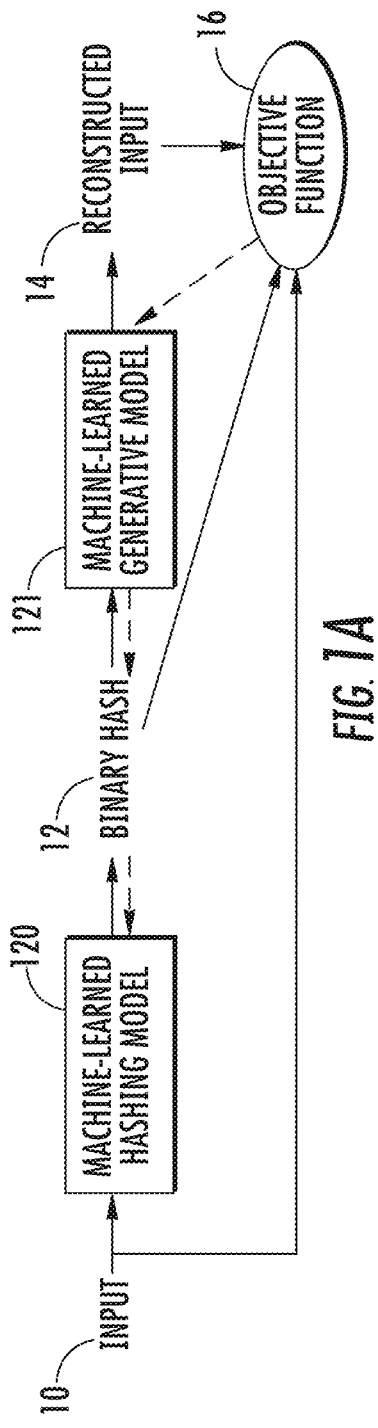
FIG. 1A depicts a block diagram of an example training scheme for a machine-learned hashing model according to example embodiments of the present disclosure.

Generally, the present disclosure is directed to systems and methods that perform stochastic generative hashing. According to one example aspect, a machine-learned hashing model that generates a binary hash for an input can be trained in conjunction with a machine-learned generative model that reconstructs the input from the binary hash. In particular, according to one example aspect, the present disclosure provides a novel generative approach to learn hash functions through, for example, Minimum Description Length principle such that the learned hash codes maximally compress the dataset. The generative approach can also be used to regenerate the inputs. According to another example aspect, the present disclosure provides an efficient learning algorithm based on the stochastic distributional gradient, which avoids the notorious difficulty caused by binary output constraints, to jointly optimize the parameters of the hashing model and the associated generative model. The present disclosure also provides extensive experiments on a variety of large-scale datasets which show that the systems and methods described herein achieve better retrieval results than the existing state-of-the-art methods.

More particularly, learning-based binary hashing can be a power paradigm for fast search and retrieval in massive databases. However, due to the requirement of discrete outputs for the hash functions, learning such functions is known to be very challenging. In addition, the objective functions adopted by certain hashing techniques are mostly chosen heuristically, which is less than optimal.

In view of the above, aspects of the present disclosure are directed to speeding up search via binary hashing. One aspect of binary hashing is to utilize a hash function, $f(\cdot)$: $X \rightarrow \{0,1\}^l$, which maps the original samples in $X \in \mathbb{R}^d$ to l-bit binary vectors $h \in \{0,1\}^l$ while preserving the similarity measure. Example similarity measures include Euclidean distance or inner product. Search with such binary representations can be efficiently conducted using, for example, Hamming distance computation, which is supported via POPCNT on modern CPUs and GPUs. Quantization based techniques have been shown to give stronger empirical results and can also be used. However, quantization based techniques also tend to be less efficient than Hamming search over binary codes.

Data-dependent hash functions are known to perform better than randomized ones. Learning hash functions or binary codes has been previously discussed in several academic works, including spectral hashing (Weiss et al. Spectral hashing. *In Advances in neural information processing systems*, pages 1753-1760, 2009), semi-supervised hashing (Wang et al. Semi-supervised hashing for scalable image retrieval. In *Computer Vision and Pattern Recognition (CVPR)*, 2010), iterative quantization (Gong and Lazebnik. Iterative quantization: A procrustean approach to learning binary codes. In *Computer Vision and Pattern Recognition (CVPR)*, 2011 *IEEE Conference on*, pages 817-824. IEEE, 2011), and others. The main idea behind these and related works is to optimize some objective function that captures the preferred properties of the hash function in a supervised or unsupervised fashion.

Even though these methods have shown promising performance in several applications, they suffer from two main drawbacks: (1) the objective functions are often heuristically constructed without a principled characterization of hash code quality, and (2) when optimizing, the binary constraints are crudely handled through some relaxation, leading to inferior results (see, e.g., Liu et al. Discrete graph hashing. In *Advances in Neural Information Processing Systems* (*NIPS*), 2014).

In view of the above, the present disclosure provides systems and methods that can perform stochastic generative hashing to address these two key issues. In particular, example systems of the present disclosure can include a generative model which captures both the encoding of binary codes h from input x and the decoding of input x from h. This provides a principled hash learning framework, where the hash function is learned, for example, by Minimum Description Length (MDL) principle. Therefore, its generated codes can compress the dataset maximally. Such a generative model also enables distributions over discrete hash codes to be optimized without the necessity to handle discrete variables. Furthermore, the present disclosure provides a novel distributional stochastic gradient descent method which exploits distributional derivatives and generates higher quality hash codes.

As one example, FIG. 1A depicts a block diagram of an example training scheme for a machine-learned hashing model 120 according to example embodiments of the present disclosure. In particular, the machine-learned hashing model 120 can be trained jointly with a machine-learned generative model 121.

The machine-learned hashing model 120 can implement a hashing function, as described above. In particular, the machine-learned hashing model can receive an input 10 and, in response, provide binary hash 12. For example, the binary hash 12 can include a binary value for each of a plurality of binary variables. For example, the binary values can be either 0 or 1 or either −1 or 1.

In some implementations, the binary hash 12 can compress the input 10. As such, in some implementations, the machine-learned hashing model 120 can be referred to as an encoder model.

The machine-learned hashing model 120 can be or include various types of models including, as examples, probabilistic models, linear models, and/or non-linear models, or combinations thereof. As one example, the machine-learned hashing model 120 can be or include a machine-learned linear projection model that generates a linear projection of the input. For example, the linear projection can be or include the binary hash 12. As another example, in some implementations in which the machine-learned hashing model 120 includes a linear projection model, the machine-learned hashing model 120 can further include one or more machine-learned non-linear layers that receive the linear projection of the input and, in response, generate the binary hash for the input.

As another example, the machine-learned hashing model 120 can be or include one or more neural networks such as, for example, deep neural networks. Example neural networks include feed forward neural networks; recurrent neural networks (e.g., long short-term memory networks); convolutional neural networks; and/or combinations thereof.

According to an aspect of the present disclosure, the machine-learned hashing model 120 can be jointly trained with a machine-learned generative model 121. The machine-learned generative model 121 can receive the binary hash 12 and, in response, output a reconstruction of the input 10, shown as reconstructed input 14 in FIG. 1A. Thus, the machine-learned generative model 121 can be a generative model that seeks to reconstruct the input 10 based on the binary hash 12. As such, in some implementations, the machine-learned generative model 121 can be referred to as a decoder model.

The machine-learned generative model 121 can be or include various types of models, including, as examples, probabilistic models, linear models, and/or non-linear models, or combinations thereof. As one example, the machine-learned generative model 121 can be or include a machine-learned Gaussian model. As another example, the machine-learned generative model 121 can be or include a machine-learned restricted Markov Random Fields model.

As another example, the machine-learned generative model 121 can be or include one or more neural networks such as, for example, deep neural networks. Example neural networks include feed forward neural networks; recurrent neural networks (e.g., long short-term memory networks); convolutional neural networks; and/or combinations thereof.

An objective function 16 can be used to train at least the machine-learned hashing model 120. For example, in some implementations, the objective function 16 can be used to jointly train both the machine-learned generative model 121 and the machine-learned hashing model 120. For example, the objective function 16 can be optimized to train the machine-learned generative model 121 and/or the machine-learned hashing model 120.

According to an aspect of the present disclosure, in some implementations, the objective function 16 does not include the plurality of binary variables as parameters. Thus, the difficult problem of directly optimizing over the binary variables can be avoided.

In particular, according to another aspect of the present disclosure, in some implementations, the objective function 16 can include a plurality of stochastic neurons that reparameterize the binary variables.

In some implementations, the objective function 16 can describe a difference between the input 10 and the reconstructed input 14. For example, the objective function 16 can evaluate a difference or loss between the input 10 and the reconstructed input 14.

In some implementations, the objective function 16 can be constructed based on the Minimum Description Length principle such that the binary hash 12 maximally compresses the input 10. As such, in some implementations, the objective function 16 can include a description length term that penalizes a description length of the binary hash 12 and/or a description length of the input 10 or the reconstructed input 14 having already communicated the binary hash 12.

As one example, in some implementations, training the model(s) based on the objective function 16 can include performing distributional stochastic gradient descent to optimize the objective function 16. In some implementations, training the model(s) based on the objective function 16 can include optimizing one or more distributions of the plurality of binary variables.

In some implementations, the objective function 16 can be backpropagated through the machine-learned generative model 121 and then continuing through the machine-learned hashing model 120. In some implementations, the objective function 16 can be backpropagated through the machine-learned hashing model 120 using one or more stochastic gradient estimators.

Figure 1B:
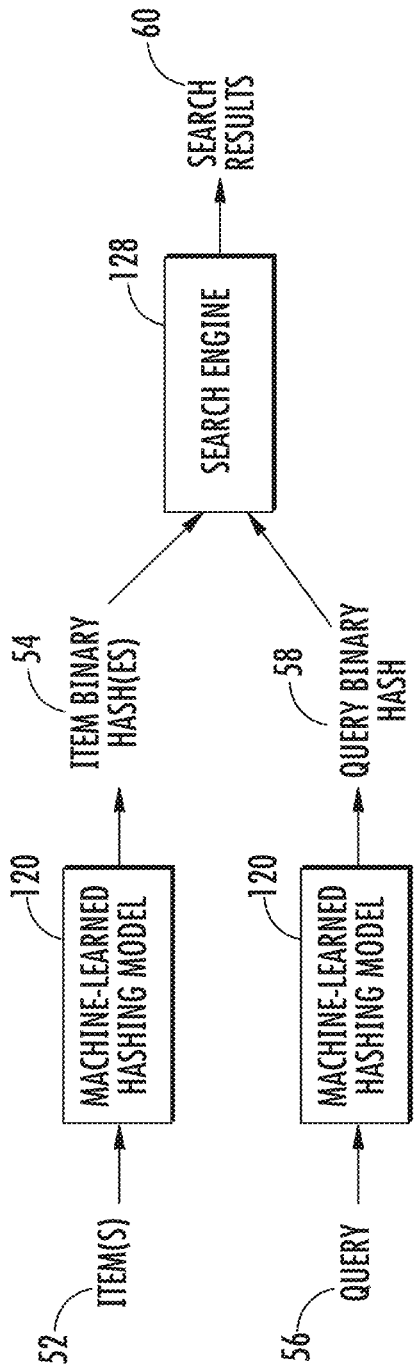
FIG. 1B depicts a block diagram of an example inference scheme for a machine-learned hashing model according to example embodiments of the present disclosure.

FIG. 1B depicts a block diagram of an example search scheme that uses the machine-learned hashing model 120 according to example embodiments of the present disclosure.

In particular, once trained, the machine-learned hashing model 120 can be used (e.g., by a user computing device and/or a server computing device) to generate an item binary hash 54 for each of a plurality of items 52. The items 52 can be documents (e.g., web documents such as web pages); images; text sources; audio files; or any other item for which a search is desired to be conducted. The plurality of item binary hashes 54 can be stored in a database.

The machine-learned model can further be employed (e.g., by a user computing device and/or a server computing device) to generate a query binary hash 58 for a query 56. For example, the query 56 can be an item as described above. A search may be desired to find items 52 that are similar to the query 56.

A search engine 128 can compare the query binary hash 58 to one or more of the item binary hash(es) 54 to identify one or more search results 60 (e.g., particular items 52 that are similar to the query 56). As an example, the search engine 128 can perform a Hamming search (e.g., a linear search in Hamming space) to identify the search result(s) 60. As other examples, the search engine 128 can use various other types of similarity metrics and/or search techniques, including quantization techniques. The search results 60 can be provided for display to a user.

The systems and methods of the present disclosure provide a number of technical effects and benefits. As one example, as demonstrated by extensive experimental results described herein, the systems and methods of the present disclosure enable improved similarity search retrieval results as compared to existing state-of-the-art binary hashing techniques. For example, the systems and methods described herein can generate binary hashes for queries and/or search items that are more optimal and higher quality relative to existing techniques, thereby enabling improved search results.

Thus, the present disclosure improves the ability of the computing system itself to identify and provide retrieval results. For example, by identifying and providing these retrieval results according to aspects of the present disclosure rather than inferior techniques such as, for example, brute-force linear search, the amount of time and processing resources required for performing the search can be reduced.

As another example technical effect and benefit, the systems and methods of the present disclosure provide or leverage improved computing techniques and algorithms which enable optimization of systems which include or use binary variables, which was heretofore an intractable problem. Through such improved computing techniques and algorithms, the computing systems described herein are able to perform computing tasks at performance levels that were heretofore unobtainable. The improved computing techniques and algorithms that enable optimization of systems which include or use binary variables also reduce time and processing requirements associated with training the system, as compared, for example, to alternating or iterative optimization techniques, all while providing guaranteed convergence.

2. Example Stochastic Generative Hashing Models

This section first formalizes the two key issues that motivate the development of aspects of the present disclosure.

Generative view: Given an input $x \in \mathbb{R}^d$, most hashing works in the literature emphasize modeling the forward process of generating binary codes from input, $h(x) \in \{0,1\}^l$, to ensure that the generated hash codes preserve the local neighborhood structure in the original space. Thus, most works do not consider modeling the reverse process of generating input from binary codes, so that the reconstructed input has small reconstruction error. The present disclosure proposes that the generative view provides a natural learning objective for hashing. Following this intuition, the present disclosure models the process of generating x from h, $p(x|h)$, and derives the corresponding hash function $q(h|x)$ from the generative process. The approach proposed by the present disclosure is not tied to any specific choice of $p(x|h)$ but can adapt to any generative model appropriate for the domain. The present disclosure shows that even using a simple generative model (see, e.g., Section 2.1) already achieves the state-of-the-art performance.

Binary Constraints:

The other issue arises from dealing with binary constraints. One possible approach is to relax the constraints from $\{0,1\}$, but this often leads to a large optimality gap between the relaxed and non-relaxed objectives. Another approach is to enforce the model parameterization to have a particular structure so that when applying alternating optimization, the algorithm can alternate between updating the parameters and binarization efficiently. For example, in the following papers an orthogonality constraint was imposed on the projection matrix (Gong and Lazebnik. Iterative quantization: A procrustean approach to learning binary codes. In *Computer Vision and Pattern Recognition (CVPR)*, 2011 *IEEE Conference on*, pages 817-824. IEEE, 2011; and Gong et al. Angular quantization-based binary codes for fast similarity search. In *Advances in neural information processing systems,* 2012); while the following paper proposed to use circulant constraints (Yu et al. Circulant binary embedding. In *International conference on machine learning*, volume 6, page 7, 2014) and the following introduced Kronecker Product structure (Zhang et al. Supervised hashing with latent factor models. In *Proceedings of the 37th international ACM SIGIR conference on Research & development in information retrieval*, pages 173-182. ACM, 2014a). Although such constraints alleviate the difficulty with optimization, they substantially reduce the model flexibility.

In contrast, in some implementations, the systems and methods of the present disclosure avoid such constraints and instead optimize the distributions over the binary variables to avoid directly working with binary variables. This is attained by leveraging a stochastic neuron reparameterization (see, e.g., Section 2.4), which allows back-propagation through the layers of weights using a stochastic gradient estimator.

Unlike some suggested techniques (see, Carreira-Perpinán and Raziperchikolaei. Hashing with binary autoencoders. In *Proceedings of the IEEE Conference on Computer Vision and Pattern Recognition*, pages 557-566, 2015) which rely on solving expensive integer programs, some implementations of the example model structures described herein can be end-to-end trainable using distributional stochastic gradient descent (see, e.g., Section 3). The distributional stochastic gradient descent algorithm requires no iterative steps unlike iterative quantization (ITQ) (Gong and Lazebnik. Iterative quantization: A procrustean approach to learning binary codes. In *Computer Vision and Pattern Recognition (CVPR)*, 2011 *IEEE Conference on*, pages 817-824. IEEE, 2011). Further, the training procedure is much more efficient with guaranteed convergence compared to alternating optimization for ITQ.

The following sections first introduce an example generative hashing model $p(x|h)$ in Section 2.1. Then, an example implementation of the process of generating hash codes given input x, $q(h|x)$ is described in Section 2.2. Finally, an example training procedure based on the Minimum Description Length (MDL) principle and the stochastic neuron reparametrization is described in Sections 2.3 and 2.4. A distributional stochastic gradient descent algorithm is described in Section 3.

2.1 Example Generative Models $p(x|h)$

Unlike most works which start with the hash function $h(x)$, the present disclosure first introduces an example generative model that defines the likelihood of generating input x given its binary code h, i.e., $p(x|h)$. It can also be referred to as a decoding function. The corresponding hash codes can be derived from an encoding function $q(h|x)$, described in Section 2.2.

As one example, a simple Gaussian distribution can be used to model the generation of x given h:

$$p(x,h)=p(x|h)p(h), \text{ where } p(x|h)=\mathcal{N}(Uh,\rho^2 I) \qquad (1)$$

and $U=\{u_i\}_{i=1}^l$, $\forall u_i \in \mathbb{R}^d$ is a codebook with l codewords. The prior $p(h)\tilde{\mathcal{B}}(\theta)=\Pi_{i=1}^l \theta_i^{h_i}(1-\theta_i)^{1-h_i}$ can be modeled as the multivariate Bernoulli distribution on the hash codes, where $\theta=[\theta_i]_{i=1}^l \in [0,1]^l$. Intuitively, this example model is an additive model which reconstructs x by summing the selected columns of U given h, with a Bernoulli prior on the distribution of hash codes. The joint distribution can be written as:

$$p(x, h) \propto \exp\left(\frac{1}{2\rho^2}\underbrace{(x^Tx + h^TU^TUh - 2x^TUh)}_{\|x-U^Th\|_2^2} - \left(\log\frac{\theta}{1-\theta}\right)^T h\right) \qquad (2)$$

This example generative model can be seen as a restricted form of general Markov Random Fields in the sense that the parameters for modeling correlation between latent variables h and correlation between x and h are shared. However, it is more flexible compared to Gaussian Restricted Boltzmann machines (see, e.g., Krizhevsky. Learning multiple layers of features from tiny images. 2009; and Marc'Aurelio and Hinton. Modeling pixel means and covariances using factorized third-order boltzmann machines. In *Computer Vision and Pattern Recognition (CVPR), 2010 IEEE Conference on*, pages 2551-2558. IEEE, 2010) due to an extra quadratic term for modeling correlation between latent variables. It will first be shown that this generative model preserves local neighborhood structure of the x when the Frobenius norm of U is bounded.

Proposition 1:

If $\|U\|_F$ is bounded, then the Gaussian reconstruction error, $\|x-Uh_x\|_2$ is a surrogate for Euclidean neighborhood preservation.

Proof.

Given two points $x, y \in \mathbb{R}^d$, their Euclidean distance is bounded by $$\|x-y\|_2$$
$$=\|(x-U^T h_x)-(y-U^T h_y)+(U^T h_x-U^T h_y)\|_2$$
$$\leq \|x-U^T h_x\|_2+\|y-U^T h_y\|_2+\|U^T(h_x-h_y)\|_2$$
$$\leq \|x-U^T h_x\|_2+\|y-U^T h_y\|_2+\|U\|_F \|h_x-h_y\|_2$$

where $h_x$ and $h_y$ denote the binary latent variables corresponding to x and y, respectively. Therefore:

$$\|x-y\|_2-\|U\|_F \|h_x-h_y\|_2 \leq \|x-U^T h_x\|_2+\|y-U^T h_y\|_2$$

which means minimizing the Gaussian reconstruction error, e.g., $-\log p(x|h)$, will lead to Euclidean neighborhood preservation.

End proof.

A similar argument can be made with respect to MIPS neighborhood preservation as shown in Section 9. Note that the choice of p(x|h) is not unique, and, in some implementations, any generative model that leads to neighborhood preservation can be used here. In fact, more sophisticated models with multiple layers and nonlinear functions can be used as well. In example experiments, complex generative models were found to perform similarly to the Gaussian model on datasets such as SIFT-1M and GIST-1M. Therefore, the Gaussian model is discussed for simplicity.

2.2 Example Encoding Models q(h|x)

Even with the simple Gaussian model of Eq. (1), computing the posterior $$p(h|x) = \frac{p(x,h)}{p(x)}$$

is not tractable, and finding the MAP solution of the posterior involves solving an expensive integer programming subproblem. As one example, the present disclosure proposes to bypass these difficulties by parameterizing the encoding function as:

$$q(h|x) = \prod_{k=1}^{l} q(h_k=1|x)^{h_k} q(h_k=0|x)^{1-h_k}, \quad (3)$$

to approximate the exact posterior p(h|x). With the linear parametrization, $h=[h_k]_{k=1}^{l} \tilde{\mathcal{B}}(\sigma(W^T x))$ with $W=[w_k]_{k=1}^{l}$. At the training step, a hash code can be obtained by sampling from $\mathcal{B}(\sigma(W^T x))$. At the inference step, it is still possible to sample h. More directly, the MAP solution of the encoding function Eq. (3) is readily given by $$h(x) = \mathrm{argmax}_h q(h|x) = \frac{\mathrm{sign}(W^T x)+1}{2}$$

This involves only a linear projection followed by a sign operation. Computing h(x) in this example model thus has the same amount of computation as ITQ, except without the orthogonality constraints.

2.3 Example Training Objective

Since one example goal is to reconstruct x using the least information in binary codes, the example variational autoencoder can be trained using the Minimal Description Length (MDL) principle, which finds the best parameters that maximally compress the training data. The MDL principle seeks to minimize the expected amount of information to communicate x:

$$L(x) = \sum_h q(h|x)(L(h)+L(x|h))$$

where $L(h)=\log p(h)+\log q(h|x)$ is the description length of the hashed representation h and $L(x|h)=\log p(x|h)$ is the description length of x having already communicated h. By summing over all training examples x, the following example training objective function can be obtained, which can be minimized with respect to the parameters of p(x|h) and q(h|x):

$$\min_{\Theta=\{W,U,\beta,\rho\}} H(\Theta) := \qquad (4)$$
$$\sum_x L(x;\Theta) = -\sum_x \sum_h q(h|x)(\log p(x,h) - \log q(h|x)),$$

where U, ρ, and $$\beta := \log \frac{\theta}{1-\theta}$$

are parameters of the generative model p(x,h) as defined in (1), and W comes from the encoding function q(h|x) defined in (3). This objective can, in some instances, be referred to as Helmholtz (variational) free energy. When the true posterior p(h|x) falls into the family of (3), q(h|x) becomes the true posterior p(h|x), which leads to the shortest description length to represent x.

Importantly, this objective no longer includes binary variables h as parameters and therefore avoids optimizing with discrete variables directly. This paves the way for continuous optimization methods such as stochastic gradient descent (SGD) to be applied in training. Thus, the systems and methods described herein are first of their kind and serve as a viable alternative to the relaxation-based approaches commonly used in the past.

2.4 Example Reparameterization via Stochastic Neuron

Using the training objective of (4), the gradients with respect to parameters of p(x|h) can be directly computed. However, the stochastic gradients with respect to W cannot be computed because it depends on the stochastic binary variables h. In order to back-propagate through stochastic nodes of h, two possible solutions have been proposed. First, the reparametrization trick which works by introducing auxiliary noise variables in the model (see, Kingma and Welling. Auto-encoding variational bayes. *arXiv preprint arXiv:* 1312.6114, 2013). However, it is difficult to apply when the stochastic variables are discrete, as is the case for h. On the other hand, the gradient estimators based on REINFORCE trick (see, Bengio et al. Estimating or propagating gradients through stochastic neurons for conditional computation. *arXiv preprint arXiv:* 1308.3432, 2013) suffer from high variance. Although some variance reduction remedies have been proposed, they are either biased or require complicated extra computation in practice.

The next section first provides an unbiased estimator of the gradient with respect to W derived based on distributional derivative, and then, derives a simple and efficient approximator. Before the estimator is derived, the stochastic neuron for reparametrizing Bernoulli distribution is first introduced.

A stochastic neuron reparameterizes each Bernoulli variable $h_k(z)$ with $z \in (0,1)$. Introducing random variables $\xi \sim (0,1)$, the stochastic neuron is defined as:

$$\tilde{h}(z, \xi) := \begin{cases} 1 & \text{if } z \geq \xi \\ 0 & \text{if } z < \xi \end{cases} \tag{5}$$

Because $\mathbb{R}(\tilde{h}(z, \xi)=1)=z$, then $\tilde{h}(z, \xi) \tilde{\mathcal{B}}(z)$. According to an aspect of the present disclosure, the stochastic neuron of (5) can be used to reparameterize the binary variables h by replacing $[h_k]_{k=1}^l(x) \tilde{\mathcal{B}}(\sigma(w_k^T x))$ with $[\tilde{h}_k(\sigma(w_k^T x), \xi_k)]_{k=1}^l$. Note that $\tilde{h}$ now behaves deterministically given $\xi$. This gives the reparameterized version of the original example training objective (4):

$$\tilde{H}(\Theta) = \sum_x \tilde{H}(\Theta; x) := \sum_x \mathbb{E}_\xi[\ell(\tilde{h}, x)], \tag{6}$$

where $\ell(\tilde{h}, x):=-\log p(x, \tilde{h}(\sigma(W^T x), \xi))+\log q(\tilde{h}(\sigma(W^T x), \xi)|x)$ with $\xi \tilde{\mathcal{U}}(0,1)$. With such a reformulation, the new objective function can now be optimized by exploiting the distributional stochastic gradient descent, which will be explained in the next section.

3. Example Distributional Stochastic Gradient Descent

For the example objective in (6), given a point x randomly sampled from $\{x_i\}_{i=1}^N$, the stochastic gradient $\hat{\nabla}_{U,\beta,\rho}\tilde{H}(\Theta; x)$ can be easily computed in the standard way. However, with the reparameterization, the function $\tilde{H}(\Theta; x)$ is no longer differentiable with respect to W due to the discontinuity of the stochastic neuron $\tilde{h}(z, \xi)$. Namely, the SGD algorithm is not readily applicable. To overcome this difficulty, the notion of distributional derivative can be adopted for generalized functions or distributions (see, Gerd Grubb. *Distributions and operators*, volume 252. Springer Science & Business Media, 2008).

3.1 Example Distributional Derivative of Stochastic Neuron

Let $\Omega \subset \mathbb{R}^d$ be an open set. Denote $\mathcal{C}_0^\infty(\Omega)$ as the space of the functions that are infinitely differentiable with compact support in $\Omega$. Let $\mathcal{D}'(\Omega)$ be the space of continuous linear functionals on $\mathcal{C}_0^\infty(\Omega)$, which can be considered as the dual space. The elements in space $\mathcal{D}'(\Omega)$ are often called general distributions. This definition of distributions is more general than that of traditional probability distributions.

Definition 2:

(Distributional derivative) Let $u \in \mathcal{D}'(\Omega)$, then a distribution v is called the distributional derivative of u, denoted as v=Du, if it satisfies $$\int_\Omega v\phi dx = -\int_\Omega u\partial\phi dx, \forall \phi \in \mathcal{C}_0^\infty(\Omega).$$

It is straightforward to verify that for given $\xi$, the function $\tilde{h}(z, \xi) \in \mathcal{D}'(\Omega)$ and moreover, $D_z \tilde{h}(z, \xi) = \delta_\xi(z)$, which is exactly the Dirac-$\delta$ function. Based on the definition of distributional derivatives and chain rules, the distributional derivative of the function $\tilde{H}(\Theta; x)$ can be computed, which is provided in the following lemma.

Lemma 3:

For a given sample x, the distributional derivative of function $\tilde{H}(\Theta; x)$ with respect to W is given by $$D_W \tilde{H}(\Theta;x) = \mathbb{E}_\xi[\Delta_{\tilde{h}} \ell(\tilde{h}(\sigma(W^T x),\xi))\sigma(W^T x)\cdot(1-\sigma(W^T x))x^T] \tag{4}$$

where $\cdot$ denotes point-wise product and $\Delta_{\tilde{h}} \ell(\tilde{h})$ denotes the finite difference defined as $[\Delta_{\tilde{h}} \ell(\tilde{h})]_k = \ell(\tilde{h}_k^1) - \ell(\tilde{h}_k^0)$, where $[\tilde{h}_k^i]_j = \tilde{h}_j$ if $k \neq j$, otherwise $[\tilde{h}_k^i]_j = i$, $i \in \{0,1\}$.

According to an aspect of the present disclosure, the distributional derivative estimators (7) can be combined with the stochastic gradient descent algorithm, which the present disclosure designates as Distributional Stochastic Gradient Descent (SGD). The detail is presented in Algorithm 3.1 where:

$$\hat{\nabla}_\Theta \tilde{H}(\Theta_i;x_i) = [\hat{D}_W \tilde{H}(\Theta_i;x_i), \hat{\nabla}_{U,\beta,\rho} \tilde{H}(\Theta_i;x_i)] \tag{8}$$

is denoted as the unbiased estimator of the gradient at $\Theta_i$ constructed by sample $x_i$, $\xi_i$.

Compared to the existing algorithms for learning to hash which require substantial effort on optimizing over binary variables (see e.g., Carreira-Perpinán and Raziperchikolaei. Hashing with binary autoencoders. In *Proceedings of the IEEE Conference on Computer Vision and Pattern Recognition*, pages 557-566, 2015), the proposed distributional SGD is much simpler and also amenable to online settings.

In general, the distributional derivative estimator (7) requires two forward passes of the model for each dimension. To further accelerate the computation, in some implementations, the distributional derivative $D_W \tilde{H}(\Theta; x)$ can be approximated by exploiting the mean value theorem and Taylor expansion by:

$$\hat{D}_W \tilde{H}(\Theta;x) := \mathbb{E}_\xi[\nabla_{\tilde{h}} \ell(\tilde{h}(\sigma(W^T x),\xi))\sigma(W^T x)\cdot(1-\sigma(W^T x))x^T], \tag{9}$$

which can be computed for each dimension in one pass. Then, this estimator $$\hat{\tilde{\nabla}}\tilde{H}(\Theta_i;x_i) = [\hat{D}_W \tilde{H}(\Theta_i;x_i), \hat{\nabla}_{U,\beta,\rho}\tilde{H}(\Theta_i;x_i)) \tag{5}$$

can be exploited in Algorithm 3.1. Refer to Section 7 for details for the derivation of the approximate gradient estimator (9).

Algorithm 3.1—Distributional-SGD:

Input: $\{x_i\}_{i=1}^N$
1: Initialize $\Theta_0 = \{W, U, \beta, \rho\}$ randomly.
2: for i=1, ..., t do
3: Sample $x_i$ uniformly from $\{x_i\}_{i=1}^N$.
4: Sample $\xi_i \tilde{\mathcal{U}}([0,1]^l)$.
5: Compute stochastic gradients $\hat{\nabla}_\Theta \tilde{H}(\Theta_i; x_i)$ or $\hat{\tilde{\nabla}}_\Theta \tilde{H}(\Theta_i; x_i)$, defined in (8) and (10), respectively.

6: Update parameters as $$\Theta_{i+1} = \Theta_i - \gamma_i \hat{\nabla}_\Theta \tilde{H}(\Theta_i; x_i), \text{ or}$$

$$\Theta_{i+1} = \Theta_i - \gamma_i \hat{\tilde{\nabla}}_\Theta \tilde{H}(\Theta_i; x_i), \text{ respectively.}$$

7: end for

3.2 Example Convergence of Distributional SGD

One caveat here is that due to the potential discrepancy of the distributional derivative and the traditional gradient, whether the distributional derivative is still a descent direction and whether the SGD algorithm integrated with distributional derivative converges or not remains unclear in general. However, for the learning to hash problem described herein, one can easily show that the distributional derivative in (7) is indeed the true gradient.

Proposition 4:

The distributional derivative $D_W\tilde{H}(\Theta; x)$ is equivalent to the traditional gradient $\nabla_W H(\Theta; x)$.

Proof

First of all, by definition, we have $\tilde{H}(\Theta; x) = H(\Theta; x)$. One can easily verify that under mild condition, both $D_W\tilde{H}(\Theta; x)$ and $\nabla_W H(\Theta; x)$ are continuous and 1-norm bounded. Hence, it suffices to show that for any distribution $u \in \mathcal{C}^1(\Omega)$ and $Du, \nabla u \in \mathcal{L}_1(\Omega)$, $Du = \nabla u$. For any $\phi \in \mathcal{C}_0^\infty(\Omega)$, by definition of the distributional derivative, we have $\int_\Omega Du\phi dx = -\int_\Omega u \partial\phi dx$. On the other hand, we always have $\int_\Omega \nabla u\phi dx = -\int u\partial\phi dx$. Hence, $\int_\Omega (Du - \nabla u)\phi dx = 0$ for all $\phi \in \mathcal{C}_0^\infty(\Omega)$. By the Du Bois-Reymond's lemma (see Lemma 3.2 in Gerd Grubb. *Distributions and operators*, volume 252. Springer Science & Business Media, 2008), we have $Du = \nabla u$.

End proof.

Consequently, the distributional SGD algorithm enjoys the same convergence property as the traditional SGD algorithm. Applying Theorem 2.1 in Ghadimi and Lan. Stochastic first- and zeroth-order methods for nonconvex stochastic programming. *SIAM Journal on Optimization*, 230 (4):0 2341-2368, 2013, one can arrive at:

Theorem 5:

Under the assumption that H is L-Lipschitz smooth and the variance of the stochastic distributional gradient (8) is bounded by $\sigma^2$ in the distributional SGD, for the solution $\Theta_R$ sampled from the trajectory $\{\Theta_i\}_{i=1}^t$ with probability $$P(R = i) = \frac{2\gamma_i - L\gamma_i^2}{\sum_{i=1}^t 2\gamma_i - L\gamma_i^2}$$

where $$\gamma_i \sim \mathcal{O}\left(\frac{1}{\sqrt{t}}\right),$$

we have $$\mathbb{E}[\|\nabla_\theta \tilde{H}(\Theta_R)\|^2] \mathcal{O}\left(\frac{1}{\sqrt{t}}\right).$$

In fact, even with the approximate gradient estimators (9), the proposed distributional SGD is also converging in terms of first-order conditions, i.e.:

Theorem 6:

Under the assumption that the variance of the approximate stochastic distributional gradient (10) is bounded by $\sigma^2$, for the solution $\Theta_R$ sampled from the trajectory $\{\Theta_i\}_{i=1}^t$ with probability $$P(R = i) = \frac{\gamma_i}{\sum_{i=1}^t \gamma_i}$$

where $$\gamma_i \hat{\mathcal{O}}\left(\frac{1}{\sqrt{t}}\right),$$

we have:

$$\mathbb{E}[(\Theta_R - \Theta^*)^T \hat{\tilde{\nabla}}_\Theta \tilde{H}(\Theta_R)]^2 \hat{\mathcal{O}}\left(\frac{1}{\sqrt{t}}\right),$$

where $\Theta^*$ denotes the optimal solution.

For the detailed proof of theorem 5 and 6, refer to the Section 8.

4. Example Connections

The proposed stochastic generative hashing is a general framework. This section discusses example connections to several existing algorithms.

Iterative Quantization (ITQ).

If some $\rho > 0$ is fixed, and $U = WR$ where $W$ is formed by eigenvectors of the covariance matrix and $R$ is an orthogonal matrix, then $U^T U = 1$. If one assumes the joint distribution as $$p(x, h) \propto \mathcal{N}(WRh, \rho^2 I) \mathcal{B}(\theta),$$

and parametrizes $q(h|x_i) = \delta_{b_i}(h)$, then from the objective in (4) and ignoring the irrelevant terms, one obtains the optimization $$\min_{R,b} \sum_{i=1}^N \|x_i - WRb_i\|^2, \quad (11)$$

which is the objective of iterative quantization.

Binary Autoencoder (BA).

If one uses the deterministic linear encoding function, $$\text{i.e., } q(h|x) = \delta_{\frac{1 + \text{sign}(W^T x)}{2}}(h),$$

and prefix some $\rho > 0$, and ignores the irrelevant terms, the optimization (4) reduces to $$\min_{U,W} \sum_{i=1}^N \|x_i - Uh\|^2, \text{ s.t. } h = \frac{1 + \text{sign}(W^T x)}{2}, \quad (12)$$

which is the objective of a binary autoencoder.

In BA, the encoding procedure is deterministic, therefore, the entropy term $\mathbb{E}_{q(h|x)}[\log q(h|x)]=0$. In fact, the entropy term, if non-zero, performs like a regularization and helps to avoid wasting bits. Moreover, without the stochasticity, the optimization (12) becomes extremely difficult due to the binary constraints. While for the example proposed algorithm, the stochasticity is exploited to bypass such difficulty in optimization. The stochasticity enables acceleration of the optimization as shown in section 5.2.

5. Example Experiments

This section evaluates the performance of example implementations of distributional SGD on commonly used datasets in hashing. Due to the efficiency consideration, the example experiments were conducted mainly with the approximate gradient estimator (9). Example models and algorithms were evaluated from several aspects to demonstrate the power of the proposed SGH:

(1) Reconstruction Loss.

To demonstrate the flexibility of generative modeling, the L2 reconstruction error was compared to that of ITQ, showing the benefits of modeling without the orthogonality constraints.

(2) Convergence of the Distributional SGD.

The reconstruction error was evaluated showing that the proposed algorithm indeed converges, verifying the theorems.

(2) Training Time.

The existing generative works require a significant amount of time for training the model. In contrast, the SGD algorithm is very fast to train both in terms of number of examples needed and the wall time.

(4) Nearest Neighbor Retrieval.

Recall K@N plots are shown on standard large scale nearest neighbor search benchmark datasets of MNIST, SIFT-1M, GIST-1M and SIFT-1B, for all of which state-of-the-art results among binary hashing methods were achieved by the systems and methods described herein.

(5) Reconstruction Visualization.

Due to the generative nature of the models described herein, the original input can be regenerated with very few bits. On MNIST and CIFAR10, the templates that correspond to each bit and the resulting reconstruction are qualitatively illustrated.

Several benchmarks datasets were used, i.e., (1) MNIST which contains 60,000 digit images of size 28×28 pixels, (2) CIFAR-10 which contains 60,000 32×32 pixel color images in 10 classes, (3) SIFT-1M and (4) SIFT-1B which contain 106 and 109 samples, each of which is a 128 dimensional vector, and (5) GIST-1M which contains 106 samples, each of which is a 960 dimensional vector.

5.1 Example Reconstruction Loss

Because example systems and methods described herein include a generative model p(x|h), the regenerated input $\tilde{x}=p(x|h)$ can be computed. Then, the $L_2$ loss of the regenerated input and the original x can be computed, i.e., $\|x-\tilde{x}\|_2^2$.

ITQ trains by minimizing the binary quantization loss, as described in Equation (2) in Gong and Lazebnik. Iterative quantization: A procrustean approach to learning binary codes. In *Computer Vision and Pattern Recognition (CVPR)*, 2011 *IEEE Conference on*, pages 817-824. IEEE, 2011, which is essentially $L_2$ reconstruction loss when the magnitude of the feature vectors is compatible with the radius of the binary cube.

Figure 2A:
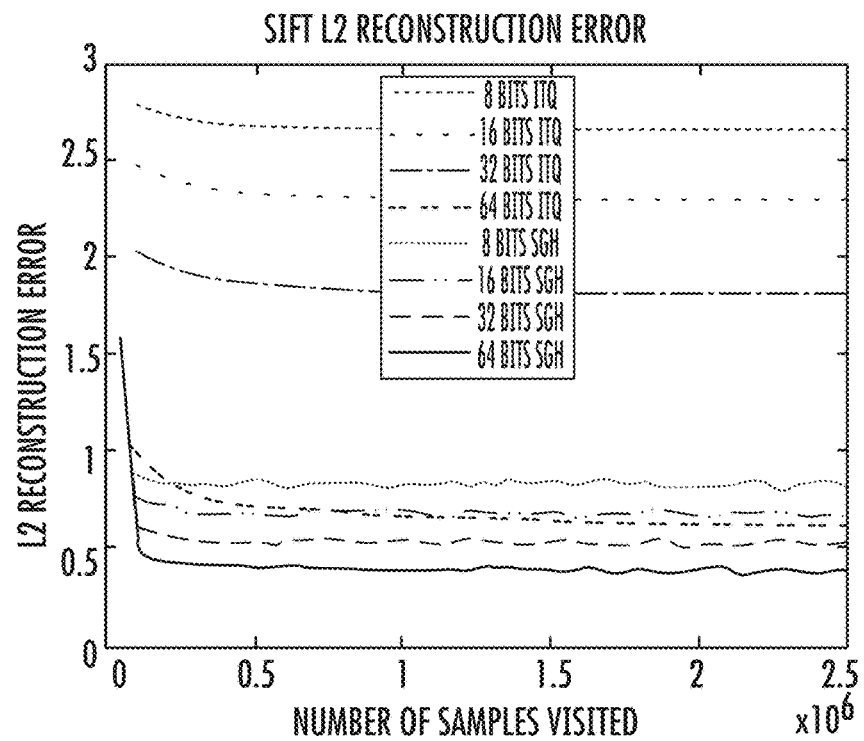
FIGS. 2A-B depict graphical diagrams of example experimental results according to example embodiments of the present disclosure.
Figure 5:
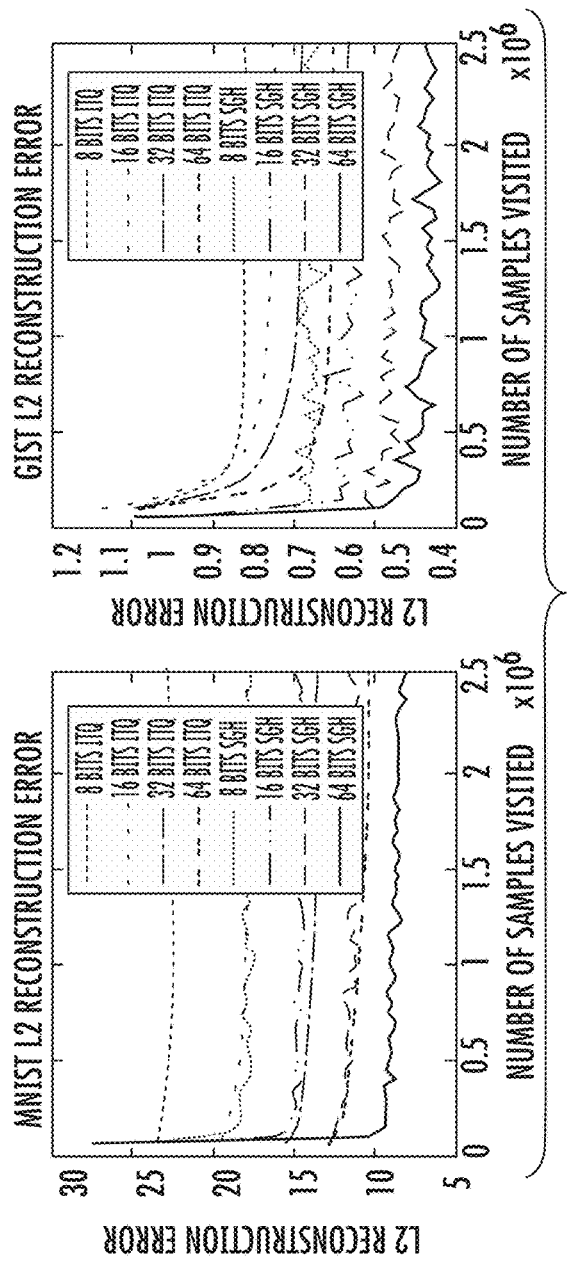
FIG. 5 depicts graphical diagrams of example experimental results according to example embodiments of the present disclosure.

The $L_2$ reconstruction loss of example implementations of the present disclosure and ITQ on SIFT-1M in FIG. 2A and on MNIST and GIST-1M in FIG. 5, where the x-axis indicates the number of examples seen by the training algorithm and the y-axis shows the average $L_2$ reconstruction loss.

The training time comparison is listed in Table 1. An example implementation of the SGH method arrives at a better reconstruction loss with comparable or even less time compared to ITQ. The lower reconstruction loss demonstrates the claim that the flexibility of the proposed model afforded by removing the orthogonality constraints indeed brings extra modeling ability. Note that ITQ is generally regarded as a technique with fast training among the existing binary hashing algorithms, and most other algorithms take much more time to train.

TABLE 1

| Training time on SIFT-1M in seconds. | | | | |
|---|---|---|---|---|
| Method | 8 bits | 16 bits | 32 bits | 64 bits |
| SGH | 28.32 | 29.38 | 37.28 | 55.03 |
| ITQ | 92.82 | 121.73 | 173.65 | 259.13 |

5.2 Example Empirical Study of Distributional SGD

The section demonstrates the convergence of the distributional derivative with Adam (Kingma and Ba. Adam: A method for stochastic optimization. *arXiv preprint arXiv: 1412.6980*, 2014) numerically on SIFT-1M, GIST-1M and MINST from 8 bits to 64 bits. The convergence curves on SIFT-1M are shown in FIG. 2A. The results on GIST-1M and MNIST are similar and shown in FIG. 5 in Section 9. Obviously, the proposed algorithm converges quickly, no matter how many bits are used. It is reasonable that with more bits, the model fits the data better and the reconstruction error can be reduced further.

Figure 2B:
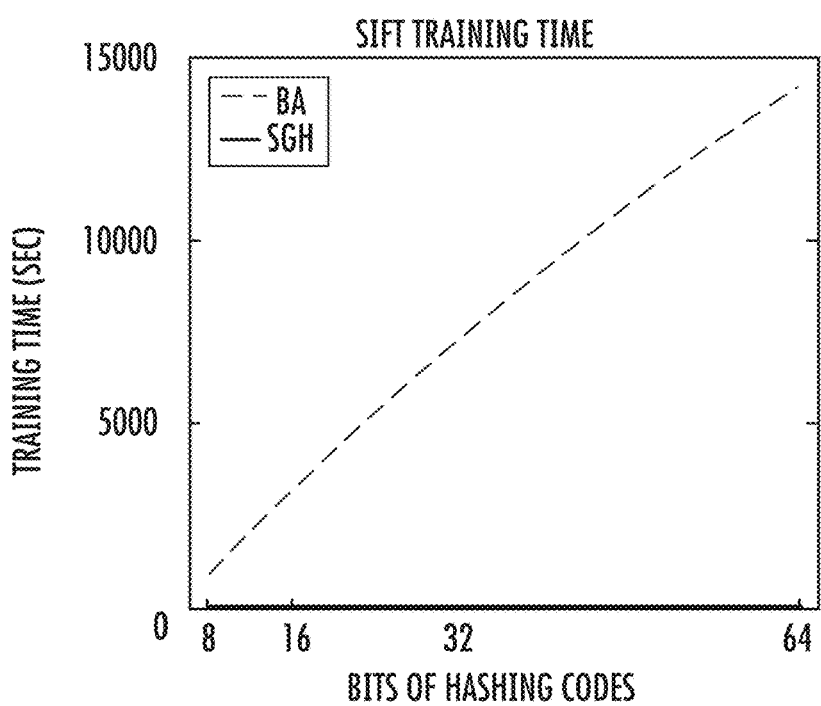

In line with the expectation, the distributional SGD of the present disclosure trains much faster since it bypasses integer programming. The actual time taken to train the method to convergence is benchmarked and compared that to binary autoencoder hashing (BA) (Carreira-Perpinán and Raziper-chikolaei. Hashing with binary autoencoders. In *Proceedings of the IEEE Conference on Computer Vision and Pattern Recognition*, pages 557-566, 2015) on SIFT-1M, GIST-1M and MINST. The performance on SIFT-1M is illustrated in FIG. 2B. The results on GIST-1M and MNIST datasets follow a similar trend as shown in the Section 9. Empirically, BA takes significantly more time to train on all bit settings due to the expensive cost for solving integer programming subproblem.

The experiments were run on AMD 2.4 GHz Opteron CPUs×4 and 32 G memory. The example implementation of stochastic neuron as well as the whole training procedure was done in TensorFlow. For the competing methods, the code released by the authors was used.

5.3 Example Large Scale Nearest Neighbor Retrieval

An example implementation of stochastic generative hashing on an L2NNS task was compared with several state-of-the-art unsupervised algorithms, including K-means hashing (KMH) (He et al. K-means hashing: An affinity-preserving quantization method for learning binary compact codes. In *Proceedings of the IEEE conference on computer vision and pattern recognition*, pages 2938-2945, 2013); iterative quantization (ITQ) (Gong and Lazebnik. Iterative quantization: A procrustean approach to learning binary codes. In *Computer Vision and Pattern Recognition (CVPR)*, 2011 *IEEE Conference on*, pages 817-824. IEEE, 2011); spectral hashing (SH) (Weiss et al. Spectral hashing. In *Advances in neural information processing systems*, pages 1753-1760, 2009); spherical hashing (SpH) (Heo et al. Spherical hashing. In *Computer Vision and Pattern Recognition (CVPR)*, 2012 *IEEE Conference on*, pages 2957-2964. IEEE, 2012); binary autoencoder (BA) (Carreira-Perpinán and Raziperchikolaei. Hashing with binary autoencoders. In *Proceedings of the IEEE Conference on Computer Vision and Pattern Recognition*, pages 557-566, 2015); and scalable graph hashing (GH) (Jiang and Li. Scalable Graph Hashing with Feature Transformation. In *Twenty-Fourth International Joint Conference on Artificial Intelligence*, 2015).

The performance of the binary codes is demonstrated by doing standard benchmark experiments of Approximate Nearest Neighbor (ANN) search and comparing the retrieval recall. In particular, example implementations of the present disclosure are compared with other unsupervised techniques that also generate binary codes. For each query, linear search in Hamming space is conducted to find the approximate neighbors.

Figure 3A:
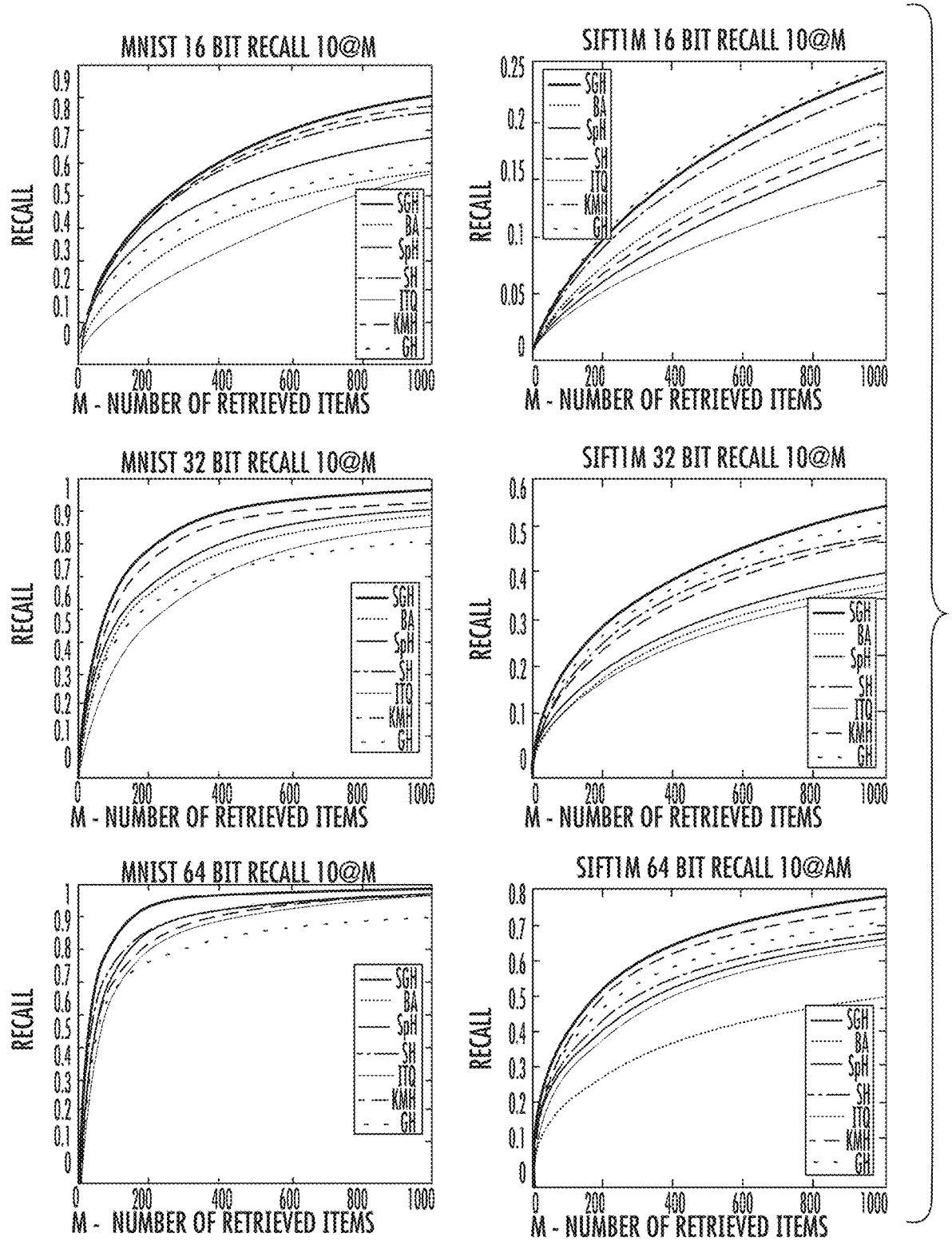
FIGS. 3A-B depict graphical diagrams of example experimental results according to example embodiments of the present disclosure.
Figure 3B:
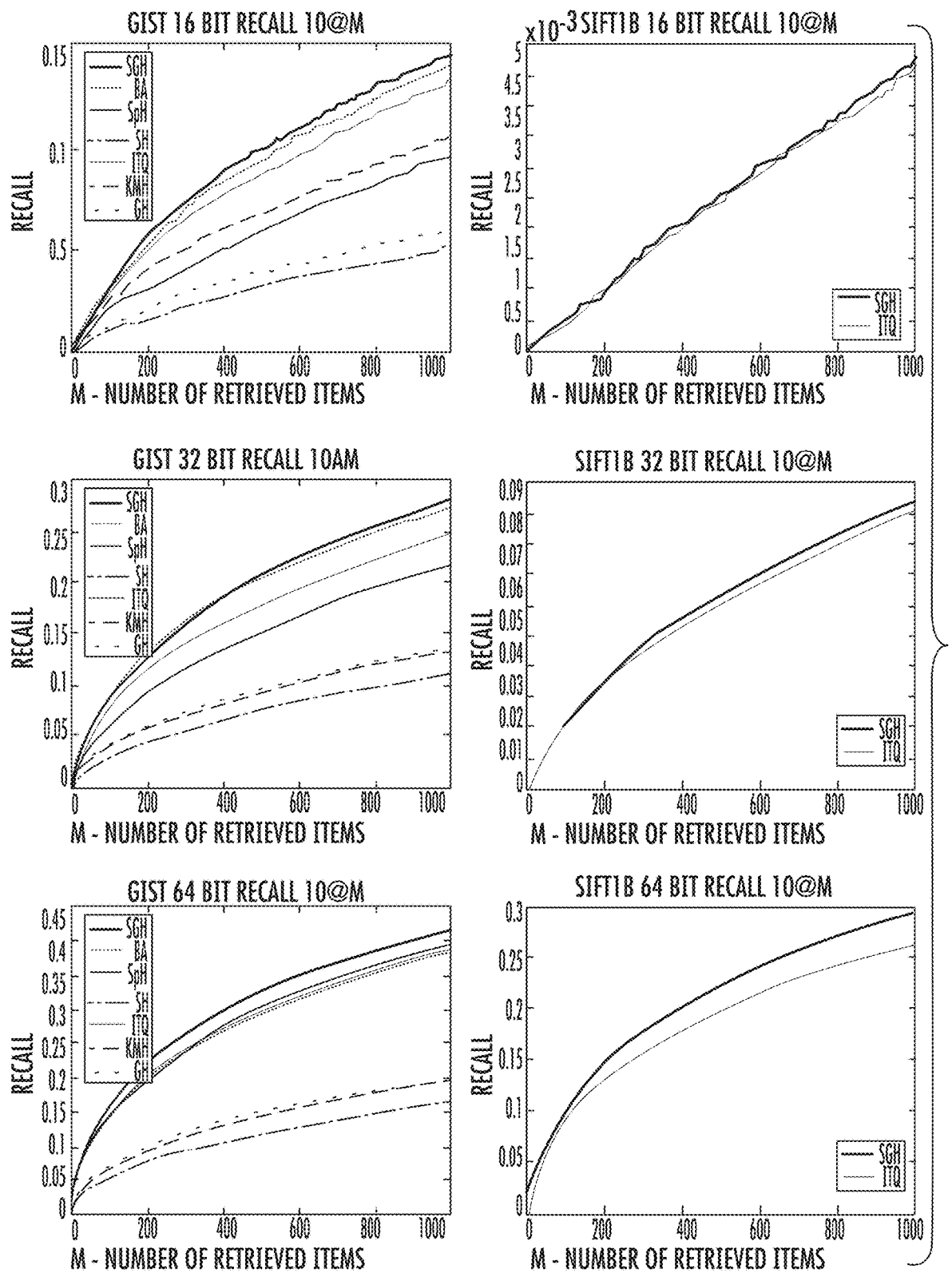

The Recall 10@N curve is plotted for MNIST, SIFT-1M, GIST-1M, and SIFT-1B datasets under varying number of bits (16, 32 and 64) in FIGS. 3A-B. On the SIFT-1B datasets, comparison is only with ITQ since the training cost of the other competitors is prohibitive. The recall is defined as the fraction of retrieved true nearest neighbors to the total number of true nearest neighbors. The Recall 10@N is the recall of 10 ground truth neighbors in the N retrieved samples. Note that Recall 10@N is generally a more challenging criteria than Recall@N (which is essentially Recall 1@N), and better characterizes the retrieval results. For completeness, results of various Recall K@N curves can be found in below which show similar trend as the Recall 10@N curves.

FIGS. 3A-B shows that the proposed SGH consistently performs the best across all bit settings and all datasets. The searching time is the same for the same number of bits, because all algorithms use the same optimized implementation of POPCNT based Hamming distance computation and priority queue.

Further note that many of the baselines need significant parameter tuning for each experiment to achieve a reasonable recall, except for ITQ and the methods described herein, where hyperparameters were fixed for all experiments and a batch size of 500 and learning rate of 0.01 were used with stepsize decay. Thus, the systems and methods of the present disclosure are less sensitive to hyperparameters.

5.4 Example Visualization of Reconstruction

One beneficial aspect of utilizing a generative model for a hash function is that one can generate the input from its hash code. When the inputs are images, this corresponds to image generation, which enables the visual inspection of what the hash bits encode, as well as the differences in the original and generated images.

In the example experiments on MNIST and CIFAR-10, the "template" was first visualized which corresponds to each hash bit, i.e., each column of the decoding dictionary U. This gives an interesting insight into what each hash bit represents. Unlike PCA components, where the top few look like averaged images and the rest are high frequency noise, each of the image template encodes distinct information and looks much like filter banks of convolution neural networks. Empirically, each template also looks quite different and encodes somewhat meaningful information, indicating that no bits are wasted or duplicated. Note that this representation is obtained as a by-product, without explicitly setting up the model with supervised information, similar to the case in convolution neural nets.

Figure 4A:
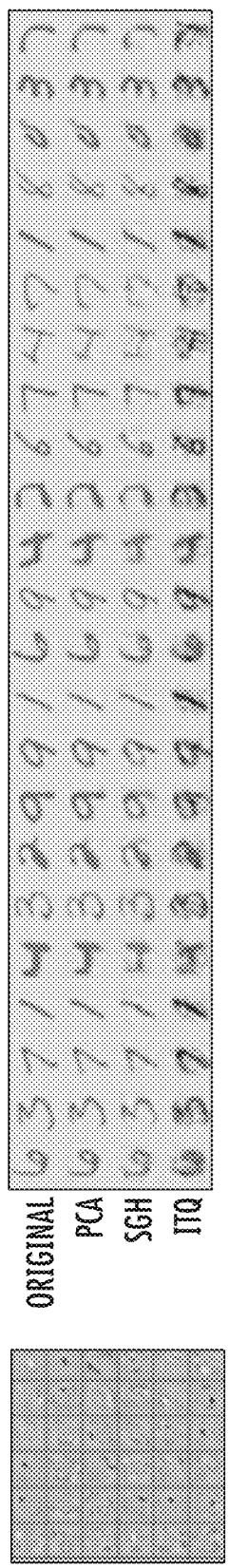
FIGS. 4A-B depicts example experimental results according to example embodiments of the present disclosure.
Figure 4B:

The reconstruction ability of example implementations of SGH with that of ITQ and real valued PCA are compared in FIGS. 4A-B. For ITQ and SGH, a 64-bit hash code was used. For PCA, 64 components were kept, which amounts to 64×32=2048 bits. Visually comparing with SGH, ITQ reconstructed images look much less recognizable on MNIST and much more blurry on CIFAR-10. Compared to PCA, SGH achieves similar visual quality while using a significantly lower (32× less) number of bits.

FIGS. 4A-B provide illustrations of MNIST and CIFAR-10 templates (left) and regenerated images (right) from different methods with 64 hidden binary variables. In particular, FIG. 4A provides the templates and regenerated images on MNIST while FIG. 4B provides the templates and regenerated images on CIFAR-10.

In MNIST, the four rows and their number of bits used to encode them are, from the top: (1) original image, 28×28× 8=6272 bits; (2) PCA with 64 components 64×32=2048 bits; (3) SGH, 64 bits; (4) ITQ, 64 bits. In CIFAR: (1) original image, 30×30×24=21600 bits; (2) PCA with 64 components 64×32=2048 bits; (3) SGH, 64 bits; (4) ITQ, 64 bits. The SGH reconstruction tends to be much better than that of ITQ, and is on par with PCA which uses 32 times more bits.

6. Example Discussion

The present disclosure provides a novel generative approach to learn binary hash functions. It has been justified from a theoretical angle that the provided algorithm is able to provide a high quality hash function that preserves Euclidean neighborhoods, while achieving fast learning and retrieval. Extensive experimental results justify the flexibility of the models described herein, especially in reconstructing the input from the hash codes. Comparisons with approximate nearest neighbor search over several benchmarks demonstrate the advantage of the proposed algorithm empirically. The proposed generative hashing is a general framework which can be extended to semi-supervised settings and other learning to hash scenarios as detailed in the following sections. Moreover, the proposed distributional SGD with the unbiased gradient estimator and its approximator can be applied to general integer programming problems.

7. Example Distributional Derivative of Stochastic Neuron

Before lemma 3 is proven, this section first introduces the chain rule of distributional derivative. (see, Gerd Grubb. *Distributions and operators*, volume 252. Springer Science & Business Media, 2008).

Lemma 7:

Let $u \in \mathcal{D}'(\Omega)$, we have 1. (Chain Rule I) The distribution derivative of $v = u \circ f$ for any $f(x) \in \mathcal{C}^1:\Omega \to \Omega$ is given by $$Dv = Du \frac{\partial f}{\partial x}.$$

2. (Chain Rule II) The distribution derivative of $v = f \circ u$ for any $f(x) \in \mathcal{C}^1(\mathbb{R})$ with $f'$ bounded is given by $Dv = f'(u)Du$.

Proof of Lemma 3. Without loss of generality, first consider 1-dimension case. Given $\ell(\tilde{h}): \mathbb{R} \to \mathbb{R}$, $\xi \sim \mathcal{U}(0,1)$, $\tilde{h}: \Omega \to \{0,1\}$. For $\forall \phi \in \mathcal{C}_0^\infty(\Omega)$, we have $$\int \phi(x) D\ell(\tilde{h}(x))dx = -\int \phi'(x)\ell(x)dx$$
$$= -\left(\int_{-\infty}^{0} \phi'(x)\ell(0)dx + \int_{0}^{\infty} \phi'(x)\ell(1)dx\right)$$
$$= -(\phi(x)|_{-\infty}^{0}\ell(0) + \phi(x)|_{0}^{\infty}\ell(1))$$
$$= (\ell(1) - \ell(0))\phi(0)$$

where the last equation comes from $\phi \in \mathcal{C}_0^\infty(\Omega)$. We obtain:

$$D\ell(\tilde{h}) = (\ell(1) - \ell(0))\delta(h) := \Delta\ell(h).$$

The conclusion can be generalized to l-dimension case with expectation over $\xi$, i.e., $\tilde{h}(\cdot, \xi): \Omega \to \{0,1\}^l$, we have the partial distributional derivative for k-th coordinate as $$D_k \mathbb{E}_{\{\xi_i\}_{i=1}^l}[\ell(\tilde{h}(z,\xi))] = \mathbb{E}_{\{\xi_i\}_{i=1}^l}[D_k \ell(\tilde{h}(z,\xi))] = \mathbb{E}_{\{\xi_i\}_{i=1,i\neq k}^l}[(\ell(\tilde{h}_k^1) - \ell(\tilde{h}_k^0))].$$

Therefore, we have the distributional derivative w.r.t. W as $$D\mathbb{E}_{\{\xi_i\}_{i=1}^l}[\ell(\tilde{h}(\sigma(W^Tx),\xi))] = \mathbb{E}_{\{\xi_i\}_{i=1}^l}[D_k \ell(\tilde{h}(\sigma(W^Tx),\xi))]$$

chain rule $$I = \mathbb{E}_{\{\xi_i\}_{i=1}^l}[D_{\tilde{h}_k}\ell(\tilde{h}(\sigma(W^Tx),\xi))\nabla_W \sigma(W^Tx)]$$
$$= \mathbb{E}_{\xi}[\Delta_{\tilde{h}}\ell(\tilde{h}(\sigma(W^Tx),\xi))\sigma(W^Tx)\cdot(1-\sigma(W^Tx))x^T].$$

To derive the approximation of the distributional derivative, exploit the mean value theorem and Taylor expansion. Specifically, for a continuous and differential loss function $\ell(\bullet)$, there exists $\varepsilon \in (0,1)$ $$\partial_{\tilde{h}_k}\ell(\tilde{h})|_{\tilde{h}_k=\varepsilon} = [\Delta_{\tilde{h}}\ell(\tilde{h})]_k.$$

Moreover, for general smooth functions, one can rewrite the $\partial_{\tilde{h}_i}\ell(\tilde{h})|_{\tilde{h}_i=\varepsilon}$ by Taylor expansion, $$\partial_{\tilde{h}_k}\ell(\tilde{h})|_{\tilde{h}_k=\varepsilon} = \partial_{\tilde{h}_i}\ell(\tilde{h})|_{\tilde{h}_i=1} + \mathcal{O}(\varepsilon)$$

$$\partial_{\tilde{h}_k}\ell(\tilde{h})|_{\tilde{h}_k=\varepsilon} = \partial_{\tilde{h}_i}\ell(\tilde{h})|_{\tilde{h}_i=0} + \mathcal{O}(\varepsilon)$$

we have an approximator as $$\partial_{\tilde{h}_k}\ell(\tilde{h})|_{\tilde{h}_k=\varepsilon} \approx \sigma(w_k^Tx)\partial_{\tilde{h}_i}\ell(\tilde{h})|_{\tilde{h}_i=1} + (1-\sigma(w_k^Tx))\partial_{\tilde{h}_i}\ell(\tilde{h})|_{\tilde{h}_i=0} = \mathbb{E}_{\xi}[\nabla_{\tilde{h}}\ell(\tilde{h},\xi)]. \quad (6)$$

Plugging into the distributional derivative estimator Eq. (7), one can obtain a simple biased gradient estimator, $$D_W \tilde{H}(\Theta;x) \approx \hat{D}_W \tilde{H}(\Theta;x) := \mathbb{E}_{\xi}[\nabla_{\tilde{h}}\ell(\tilde{h}(\sigma(W^Tx),\xi))\sigma(W^Tx)\cdot(1-\sigma(W^Tx))x^T]. \quad (7)$$

8. Example Convergence of Distributional SGD

Lemma 8:
(see Ghadimi and Lan. Stochastic first- and zeroth-order methods for nonconvex stochastic programming. *SIAM Journal on Optimization*, 230 (4):0 2341-2368, 2013) Under the assumption that H is L-Lipschitz smooth and the variance of the stochastic distributional gradient Eq. (8) is bounded by $\sigma^2$, the proposed distributional SGD outputs $\{\Theta_i\}_{i=1}^t$, $$\sum_{i=1}^{t}\left(\gamma_i - \frac{L}{2}\gamma_i^2\right)\mathbb{E}[\|\nabla_\Theta \tilde{H}(\Theta_i)\|^2] \leq \tilde{H}(\Theta_0) - \tilde{H}(\Theta^*) + \frac{L\sigma^2}{2}\sum_{i=1}^{t}\gamma_i^2,$$

where $\Theta_t = \{W_t, U_t, \beta_t, \rho_t\}$.
Proof of Theorem 5.
Lemma 8 implies that by randomly sampling a search point $\Theta_R$ with probability $$P(R = i) = \frac{2\gamma_i - L\gamma_i^2}{\sum_{i=1}^{t} 2\gamma_i - L\gamma_i^2}$$

where $$\gamma_i \sim \mathcal{O}\left(\frac{1}{\sqrt{t}}\right)$$

from trajectory $\{\Theta_i\}_{i=1}^t$, we have $$\mathbb{E}[\|\nabla_\Theta \tilde{H}(\Theta_R)\|^2] \sim \mathcal{O}\left(\frac{1}{\sqrt{t}}\right).$$

Lemma 9:
Under the assumption that the variance of the approximate stochastic distributional gradient Eq. (10) is bounded by $\sigma^2$, the proposed distributional SGD outputs $\{\Theta_i\}_{i=1}^t$ such that $$\sum_{i=1}^{t}\gamma_i \mathbb{E}[(\Theta_i - \Theta^*)^T \tilde{\nabla}_\Theta \tilde{H}(\Theta_i)] \leq \frac{1}{2}\left(\mathbb{E}[\|\Theta_0 - \Theta^*\|^2] + \sum_{i=1}^{t}\gamma_i^2 \sigma^2\right),$$

where $\Theta^*$ denotes the optimal solution.
Proof.
Denote the optimal solution as $\Theta^*$, we have $$\|\Theta_{i+1} - \Theta^*\|^2 = \|\Theta_i - \gamma_i \hat{\tilde{\nabla}}_\Theta \tilde{H}(\Theta_i, x_i) - \Theta^*\|^2$$

$$= \|\Theta_i - \Theta^*\|^2 + \gamma_i^2 \|\hat{\tilde{\nabla}}_\Theta \tilde{H}(\Theta_i, x_i)\|^2 - 2\gamma_i(\Theta_i - \Theta^*)^T \hat{\tilde{\nabla}}_\Theta \tilde{H}(\Theta_i, x_i).$$

Taking expectation on both sides and denoting $a_j = \|\Theta_j - \Theta^*\|^2$, we have $$\mathbb{E}[\alpha_{i+1}] \leq \mathbb{E}[\alpha_i] - 2\gamma_i \mathbb{E}[(\Theta_i - \Theta^*)^T \tilde{\nabla}_\Theta \tilde{H}(\Theta_i)] + \gamma_i^2 \sigma^2.$$

Therefore, $$\sum_{i=1}^{t}\gamma_i \mathbb{E}[(\Theta_i - \Theta^*)^T \tilde{\nabla}_\Theta \tilde{H}(\Theta_i)] \leq \frac{1}{2}\left(\mathbb{E}[a_0] + \sum_{i=1}^{t}\gamma_i^2 \sigma^2\right).$$

Proof of Theorem 6.
The lemma 9 implies by randomly sampling a search point $\Theta_R$ with probability $$P(R=i) = \frac{\gamma_i}{\sum_{i=1}^{t} \gamma_i}$$

where $\gamma_i \tilde{\mathcal{O}}(1/\sqrt{t})$ from trajectory $\{\Theta_i\}_{i=1}^{t}$, we have $$\mathbb{E}[(\Theta_R - \Theta^*)^T \tilde{\nabla}_\Theta \tilde{H}(\Theta_R)] \leq \frac{\mathbb{E}[\|\Theta_0 - \Theta^*\|^2] + \sum_{i=1}^{t} \gamma_i^2 \sigma^2}{2 \sum_{i=1}^{t} \gamma_i} \tilde{\mathcal{O}}\left(\frac{1}{\sqrt{t}}\right).$$

9. Additional Example Experiments

9.1 Example Convergence of Distributional SGD and Reconstruction Error Comparison FIG. 5 depicts graphs of example L2 reconstruction error convergence on MNIST and GIST-1M of ITQ and SGH over the course of training with varying of the length of the bits (8, 16, 32, 64, respectively). The x-axis represents the number of examples seen by the training. For ITQ, it sees the training dataset once in one iteration.

The results are similar to the performance on SIFT-1M. Because SGH optimizes a more expressive objective than ITQ (without orthogonality) and does not use alternating optimization, it finds better solutions with lower reconstruction error.

9.2 Example Training Time Comparison

Figure 6:
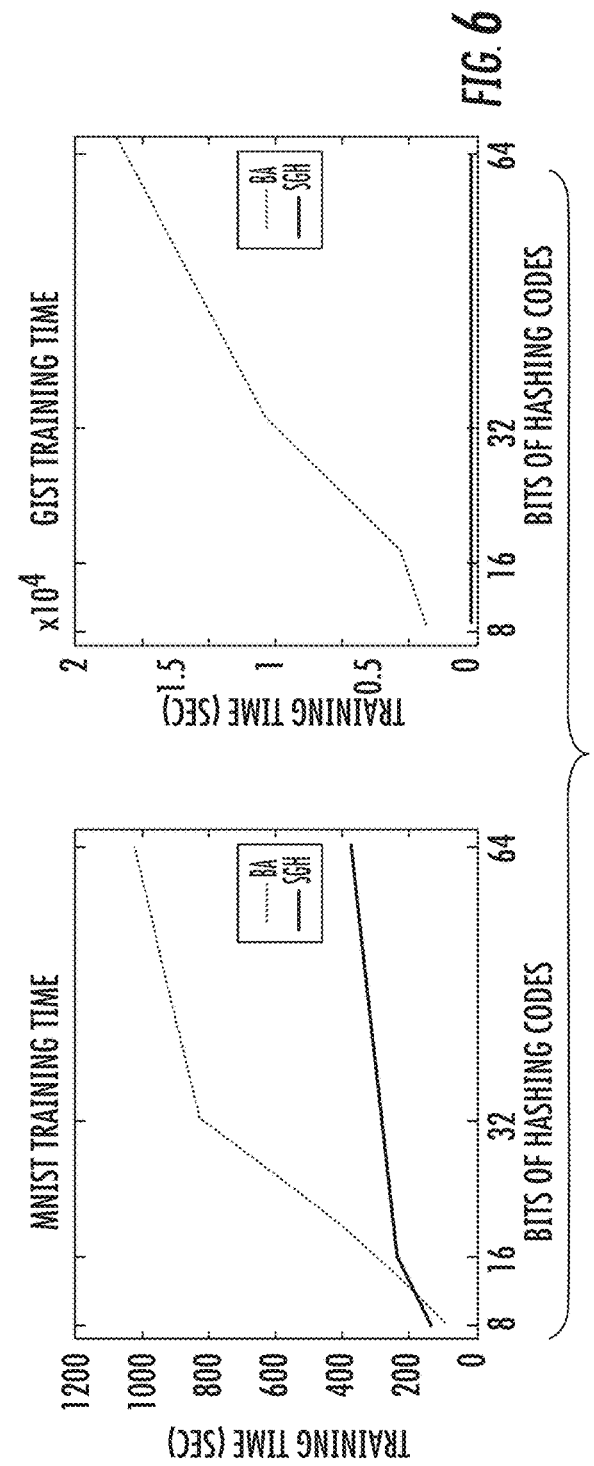
FIG. 6 depicts graphical diagrams of example experimental results according to example embodiments of the present disclosure.

FIG. 6 depicts graphs of an example training time comparison between BA and SGH on MNIST and GIST-1M. The results are similar to the performance on SIFT-1M. The proposed distributional SGD learns the model much faster.

9.3 Additional Example Evaluation on L2NNS Retrieval Tasks

Figure 7A:
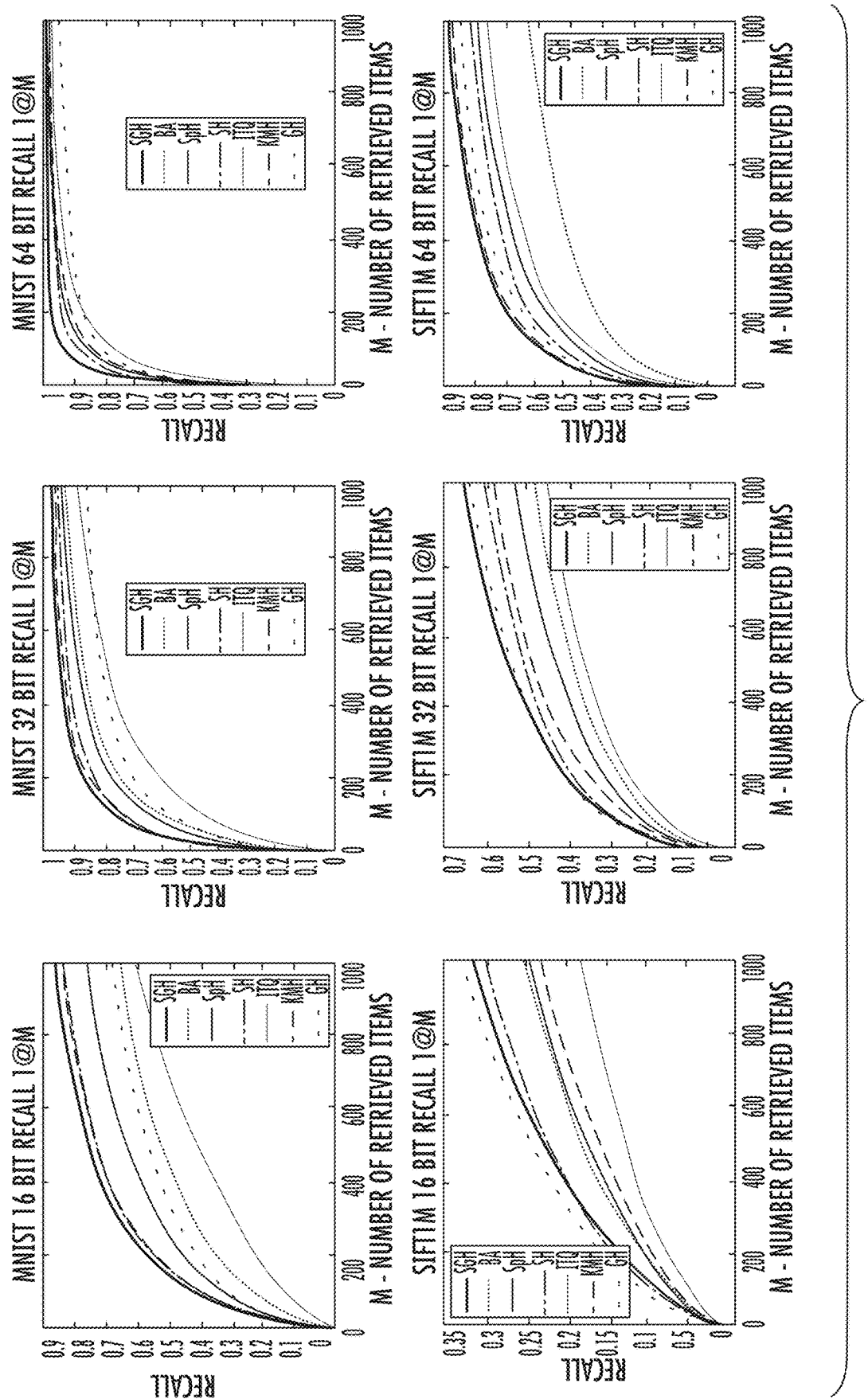
FIG. 7A-B depict graphical diagrams of example experimental results according to example embodiments of the present disclosure.
Figure 7B:
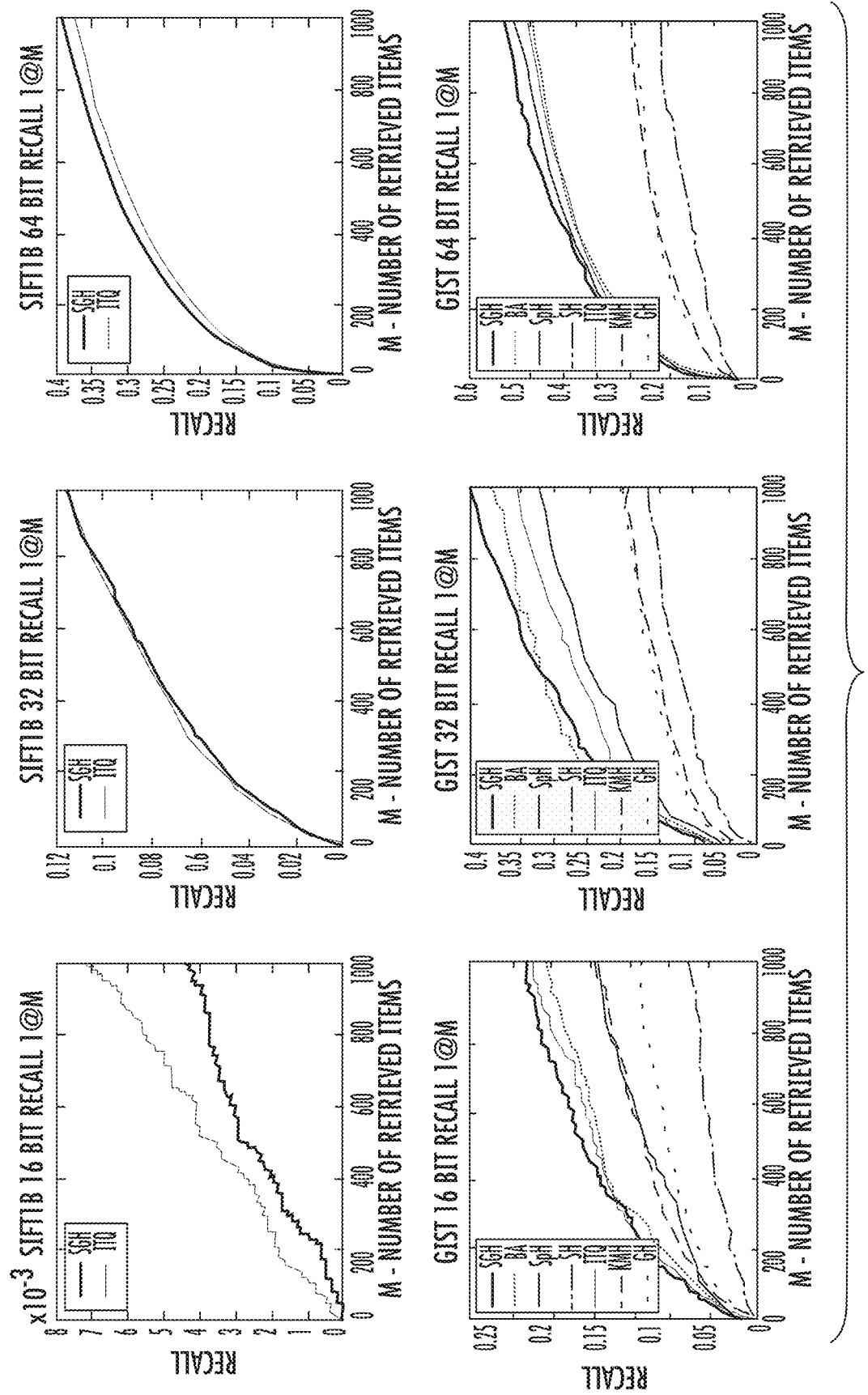

FIGS. 7A-B depict graphs of example L2NNS comparisons on MNIST, SIFT-1M, SIFT-1B, and GIST-1M with the length of binary bits from 16 to 64. The performance was evaluated with Recall 1@M, where M increasing to 1000.

Different Recall K@N was also used to evaluate the performances of example implementations of the algorithm proposed herein and the competitors. The performance of the algorithms with Recall 1@N was first evaluated, as illustrated in FIGS. 7A-B. This is an easier task comparing to K=10. Under such measure, the proposed SGH still achieves the state-of-the-art performance.

Figure 8:
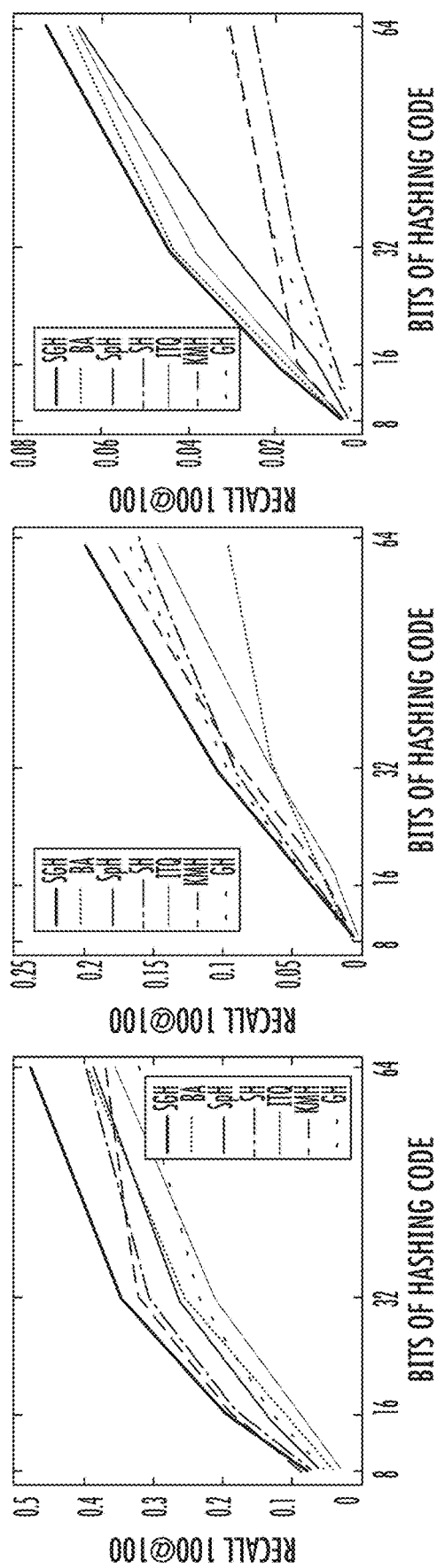
FIG. 8 depicts graphical diagrams of example experimental results according to example embodiments of the present disclosure.

In FIG. 8, K, N is set to 100 the recall is plotted by varying the length of the bits on MNIST, SIFT-1M, and GIST-1M. This is to show the effects of length of bits in different baselines. Similar to the Recall 10@N, the proposed algorithm still consistently achieves the state-of-the-art performance under such evaluation measure.

10. Example Stochastic Generative Hashing for Maximum Inner Product Search

In Maximum Inner Product Search (MIPS) problem, the similarity is evaluated in terms of inner product which can avoid the scaling issue, e.g., the length of the samples in reference dataset and the queries may vary. The systems and methods of the present disclosure can also be applied to the MIPS problem. In fact, the example Gaussian reconstruction model also preserves the inner product neighborhoods. Denote the asymmetric inner product as $x^T U h_y$, and:

Proposition 10:

The Gaussian reconstruction error is a surrogate for asymmetric inner product preservation.

Proof.

We evaluate the difference between inner product and the asymmetric inner product, $$\|x^T y - x^T U^T h_y\|_2 = \|x^T(y - U^T h_y)\|_2 \leq \|x\|_2 \|y - U^T h_y\|_2,$$

which means minimizing the Gaussian reconstruction, e.g., $-\log p(x|h)$, error will also lead to asymmetric inner product preservation.

End proof.

The systems and methods of the present disclosure are designed for hashing problems primarily. Although they can be used for MIPS problem, they are different from the product quantization and its variants whose distance are calculated based on lookup table. The proposed distributional SGD can be used with quantization as well.

10.1 Example MIPS Retrieval Comparison

To evaluate the performance of the proposed SGH on MIPS problem, the algorithm was tested on the WORD2VEC dataset for MIPS task. Besides the hashing baselines, since KMH is the Hamming distance generalization of PQ, the KMH was replaced with product quantization (see, Jegou et al. Product quantization for nearest neighbor search. *IEEE transactions on pattern analysis and machine intelligence*, 330 (1):0 117-128, 2011).

An example implementation of SGH was trained with 71,291 samples and the performance was evaluated with 10,000 queries. Similarly, the length of binary codes was varied from 16, 32 to 64, and the performance was evaluated by Recall 10@N. The ground-truth was calculated via retrieval through the original inner product.

Figure 9:
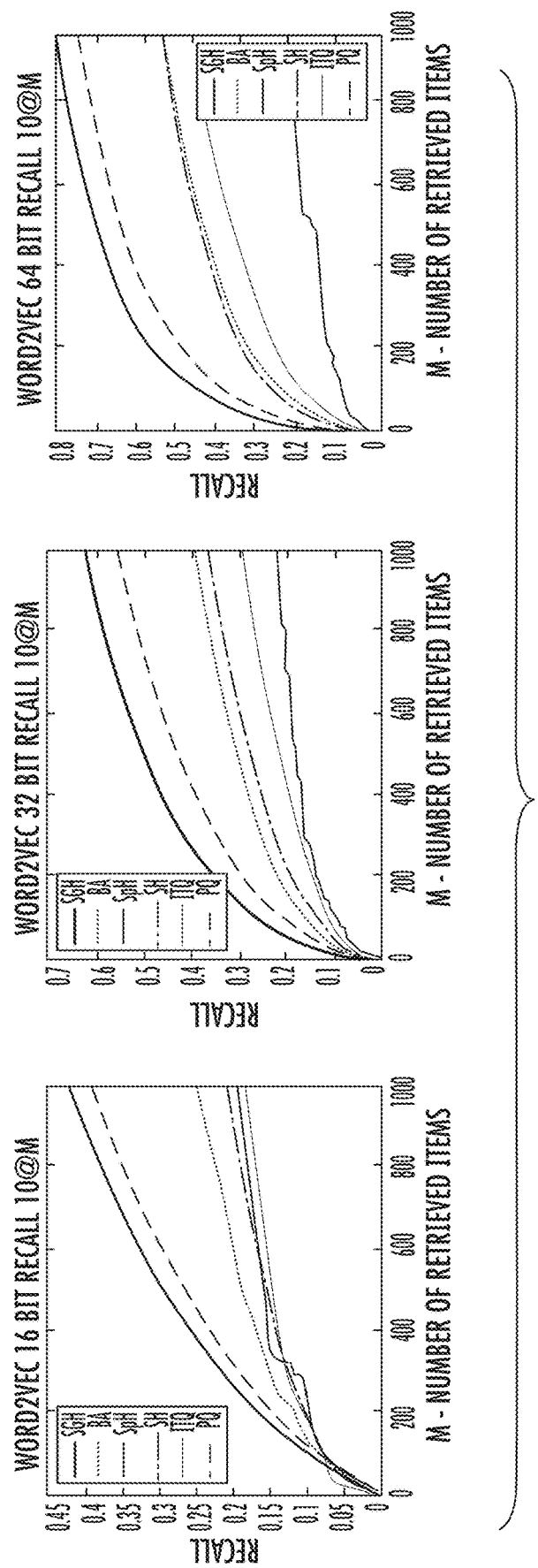
FIG. 9 depicts graphical diagrams of example experimental results according to example embodiments of the present disclosure.

The example performances are illustrated in FIG. 9. In particular, FIG. 9 depicts MIPS comparison on WORD2VEC with the length of binary bits from 16 to 64. The performance was evaluated with Recall 10@M, where M increasing to 1000. Example implementations of the proposed SGH technique outperform the competitors significantly, demonstrating that the proposed SGH technique is also applicable to MIPS task.

11. Example Generalization

The basic models described herein can be generalized to translation and scale invariant extension, semi-supervised extension, as well as coding with $h \in \{-1, 1\}^l$.

11.1 Example Translation and Scale Invariant Reduced-MRFs

The data may not zero-mean, and the scale of each sample in dataset can be totally different. To eliminate the translation and scale effects, the basic models can be extended to translation and scale invariant reduced-MRFs by introducing parameter $\alpha$ to separate the translation effect and the latent variable z to model the scale effect in each sample x, therefore, the potential function becomes $$E(x, h, z) = -\beta^T h + \frac{1}{2\rho^2}(x - \alpha - U^T(z \cdot h))^T(x - \alpha - U^T(z \cdot h)), \quad (15)$$

where $\cdot$ denotes element-wise product, $\alpha \in \mathbb{R}^d$ and $z \in \mathbb{R}^l$. Comparing to Eqn. (2), one can replace $U^T h$ with $U^T(z \cdot h) + \alpha$ so that the translation and scale effects in both dimension and sample are modeled explicitly.

One can treat the $\alpha$ as parameters and z as latent variable. Assuming the independence in posterior for computational efficiency, one can approximate the posterior p(z, h|x) with q(h|x; $W_h$)q(z|x; $W_z$), where $W_h$, $W_z$ denotes the parameters in the posterior approximation. With similar derivation, one can obtain the learning objective as $$\max_{U,\alpha,\beta,\rho;W_h,W_z} \frac{1}{N} \sum_{i=1}^{N} \mathbb{E}_{q(h|x_i)q(z|x_i)}[-E(x, h, z) - \log q(h | x_i) - \log q(z | x_i)]. \quad (16)$$

The proposed distributional SGD is still applicable to this optimization.

11.2 Example Semi-supervised Extension

Although example aspects of the present disclosure have been described with a focus on learning the hash function in unsupervised setting, the systems and methods of the present disclosure can be easily extended to exploit the supervision information by introducing pairwise model, e.g., the following papers: Zhang et al. Supervised hashing with latent factor models. In *Proceedings of the 37th international ACM SIGIR conference on Research & development in information retrieval*, pages 173-182. ACM, 2014a; and Zhu et al. Deep hashing network for efficient similarity retrieval. In *Thirtieth AAAI Conference on Artificial Intelligence*, 2016. Specifically, one can be provided with the (partial) supervision information for some pairs of data, i.e., $S = \{x_i, x_j, y_{ij}\}_{i,j}^M$, where $$y_{ij} = \begin{cases} 1 & \text{if } x_i \in \mathcal{NN}(x_j) \text{ or } x_j \in \mathcal{NN}(x_i) \\ 0 & o.w. \end{cases},$$

and $\mathcal{NN}(x)$ stands for the set of nearest neighbors of x. In addition to the original Gaussian reconstruction model in the basic model in Eq. (2), the present disclosure introduces the pairwise model $p(y_{ij}|h_i, h_j) = \mathcal{B}(\sigma(h_i^T h_j))$ into the framework, which results the joint distribution over x, y, h as $$p(x_i, x_j, h_i, h_j, y_{ij}) = p(x_i|h_i)p(x_j|h_j)p(h_i)p(h_j)p(y_{ij}|h_i, h_j)^{1_S(ij)},$$

where $1_S$(ij) is an indicator that outputs 1 when $(x_i, x_j) \in S$, otherwise 0. Plug the extended model into the Helmholtz free energy, we have the learning objective as, $$\max_{U,\beta,\rho;W} \frac{1}{N^2} \sum_{i,j=1}^{N^2} \left( \mathbb{E}_{q(h_i|x_i)q(h_j|x_j)}[\log p(x_i, x_j, h_i, h_j)] + \mathbb{E}_{q(h_i|x_i)q(h_j|x_j)} \right.$$
$$\left. [1_S(ij)\log p(y_{ij} | h_i, h_j)] - \mathbb{E}_{q(h_i|x_i)q(h_j|x_j)}[\log q(h_j | x_j)q(h_i | x_i)] \right),$$

The proposed distributional SGD is still applicable to the semi-supervised extension.

11.3 Example {±1}-Binary Coding

The example discussion above is mainly focused on coding with {0,1}. In fact, the proposed model is applicable to coding with {-1,1} with minor modification. Moreover, the proposed distributional SGD is still applicable. The model can also be extended to scale-invariant and semi-supervised variants.

If one sets $h \in \{-1,1\}^l$, the potential function of basic reduced-MRFs Eq. (2) does not have any change, i.e., $$E(x, h) = -\beta^T h + \frac{1}{2\rho^2}(x^T x + h^T U^T U h - 2x^T U h). \quad (17)$$

Next, modify the parametrization of q(h|x) as $$q(h | x) = \prod_{i=1}^{l} \sigma(w_i^T x)^{\frac{1+h_i}{2}} (1 - \sigma(w_i^T x))^{\frac{1-h_i}{2}}. \quad (18)$$

Therefore, the stochastic neuron becomes:

$$f(z, \xi) := \begin{cases} 1 & \text{if } \sigma(z) \geq \xi \\ -1 & \text{if } \sigma(z) < \xi \end{cases}.$$

With similar derivation, we have the distributional derivative of the objective w.r.t. W as $$\nabla_W L_{sn} = \mathbb{E}_\xi[\Delta_f \ell(f(z,\xi))\nabla_z \sigma(z)x^T]. \quad (19)$$

where $[\Delta_f \ell(f(z, \xi))]_k = \ell(f_k^1) - \ell(f_k^{-1})$. Furthermore, we have a similar biased gradient estimator as:

$$\tilde{\nabla}_W L_{sn} = \mathbb{E}_\xi[\nabla_f \ell(f(z,\xi))\nabla_z \sigma(z)x^T]. \quad (20)$$

Plugging these modifications into the model and algorithm enable learning a {-1,1}-encoding function.

12. Example Devices and Systems

Figure 10:
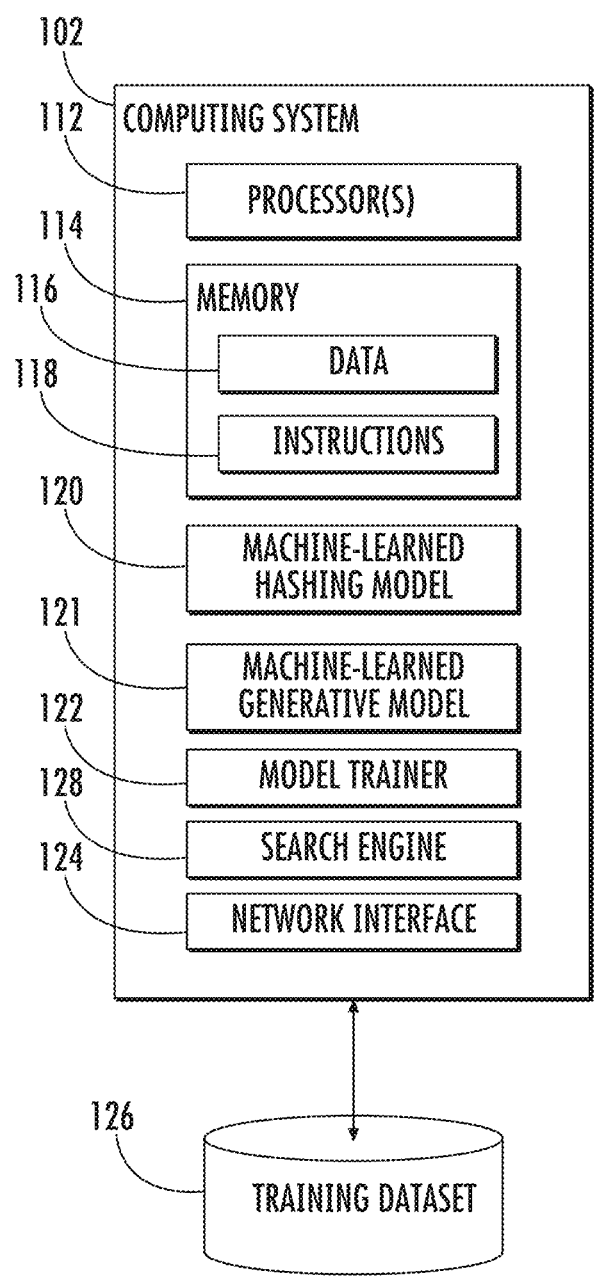
FIG. 10 depicts a block diagram of an example computing system according to example embodiments of the present disclosure.

FIG. 10 depicts a block diagram of an example computing system 102 according to example embodiments of the present disclosure. The computing system 102 can include one or more physical computing devices. The one or more physical computing devices can be any type of computing device, including a server computing device, a personal computer (e.g., desktop or laptop), a mobile computing device (e.g., smartphone or tablet), an embedded computing device, or other forms of computing devices, or combinations thereof. The computing device(s) can operate sequentially or in parallel. In some implementations, the computing device(s) can implement various distributed computing techniques.

The computing system includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor(s) 112 to cause the computing system 102 to perform operations.

The computing system 102 can further include a machine-learned hashing model 120 and a machine-learned generative model 121. Example aspects and implementations of the models 120 and 121 were described in further detail above with reference to FIGS. 1A-B.

In some implementations, a first computing device included in the computing system 102 that performs model training can store both the machine-learned hashing model 120 and the machine-learned generative model 121; while a second computing device included in the computing system 102 that performs similarity searches may store and use the machine-learned hashing model 120 but not the machine-learned generative model 121.

The computing system 102 can include a model trainer 122 that trains the machine-learned models 120 and 121 using various training or learning techniques, such as, for example, backwards propagation of errors. The model trainer 122 can perform a number of generalization techniques (e.g., weight decays, dropouts, etc.) to improve the generalization capability of the models being trained. In some implementations, the model trainer 122 can perform or be leveraged to perform one or more (e.g., all) operations of method 1100 of FIG. 11.

The model trainer 122 includes computer logic utilized to provide desired functionality. The model trainer 122 can be implemented in hardware, firmware, and/or software controlling a general purpose processor. For example, in some implementations, the model trainer 122 includes program files stored on a storage device, loaded into a memory and executed by one or more processors. In other implementations, the model trainer 122 includes one or more sets of computer-executable instructions that are stored in a tangible computer-readable storage medium such as RAM hard disk or optical or magnetic media.

The computing system 102 can further include a search engine 128. In some implementations, the search engine 128 can perform a similarity search over binary hash codes using a Hamming distance computation. In some implementations, the search engine 128 can perform a similarity search using quantization techniques. In some implementations, the search engine 128 can perform or be leveraged to perform one or more (e.g., all) operations of method 1200 of FIG. 12.

The search engine 128 includes computer logic utilized to provide desired functionality. The search engine 128 can be implemented in hardware, firmware, and/or software controlling a general purpose processor. For example, in some implementations, the search engine 128 includes program files stored on a storage device, loaded into a memory and executed by one or more processors. In other implementations, the search engine 128 includes one or more sets of computer-executable instructions that are stored in a tangible computer-readable storage medium such as RAM hard disk or optical or magnetic media.

The computing system 102 can also include a network interface 124 used to communicate with one or more systems or devices, including systems or devices that are remotely located from the computing system 102. The network interface 124 can include any number of components to provide networked communications (e.g., transceivers, antennas, controllers, cards, etc.).

The computing system 102 can also include or otherwise have access to a training dataset 126. In some implementations, the training dataset 126 can include unsupervised training examples or semi-supervised training examples. The model trainer 122 can train the models 120 and 121 using the training dataset 126.

FIG. 10 illustrates one example computing system that can be used to implement the present disclosure. Other computing systems can be used as well.

13. Example Methods

Figure 11:
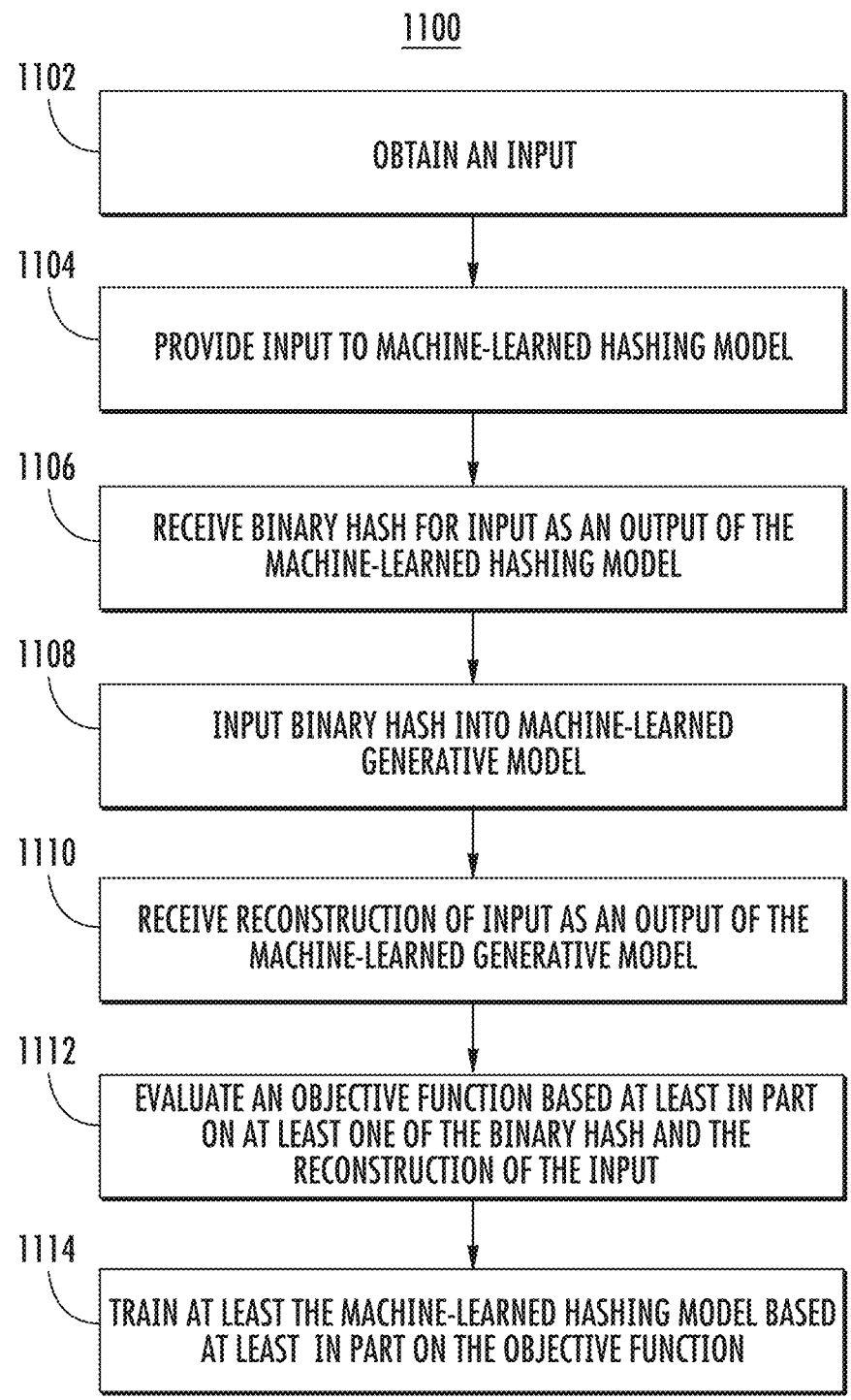
FIG. 11 depicts a flow chart diagram of an example method to train a machine-learned hashing model according to example embodiments of the present disclosure.

FIG. 11 depicts a flow chart diagram of an example method 1100 to train a machine-learned hashing model according to example embodiments of the present disclosure.

At 1102, a computing system obtains an input. For example, the input can be a training example.

At 1104, the computing system provides the input to a machine-learned hashing model. At 1106, the computing system receives a binary hash for the input as an output of the machine-learned hashing model. In some implementations, the binary hash provides or includes a binary value for each of a plurality of binary variables.

As one example, in some implementations, the machine-learned hashing model can be or include a machine-learned linear projection model that generates a linear projection of the input. In some of such implementations, the machine-learned hashing model can include one or more machine-learned non-linear layers that receive the linear projection of the input and, in response, generate the binary hash for the input. As another example, in some implementations, the machine-learned hashing model can be or include a machine-learned neural network.

At 1108, the computing system inputs the binary hash into a machine-learned generative model. At 1110, the computing system receives a reconstruction of the input as an output of the machine-learned generative model.

As one example, in some implementations, the machine-learned generative model can be or include a machine-learned Gaussian model. As another example, in some implementations, the machine-learned generative model can be or include a machine-learned restricted Markov Random Fields model. As yet another example, in some implementations, the machine-learned generative model can be or include a machine-learned neural network.

At 1112, the computing system evaluates an objective function based at least in part on at least one of the binary hash and the reconstruction of the input. In some implementations, the objective function can evaluate a difference between the input and the reconstruction of the input. For example, the difference can be a reconstruction loss.

In some implementations, the objective function does not include the plurality of binary variables as parameters. In some implementations, the objective function includes a plurality of stochastic neurons that reparameterize the plurality of binary variables. In some implementations, the objective function includes a description length term that penalizes a description length of the binary hash.

At 1114, the computing system trains at least the machine-learned hashing model based at least in part on the objective function.

In some implementations, the machine-learned hashing model and the machine-learned generative model can be jointly trained end-to-end using the objective function. For example, the objective function can be backpropagated through the machine-learned generative model and then continuing through the machine-learned hashing model.

In some implementations, training at least the machine-learned hashing model based at least in part on the objective function at 1114 can include performing distributional stochastic gradient descent to optimize the objective function.

In some implementations, training at least the machine-learned hashing model based at least in part on the objective function at 1114 can include optimizing one or more distributions of the plurality of binary variables.

In some implementations, training at least the machine-learned hashing model based at least in part on the objective function at 1114 can include backpropagating the objective function through the machine-learned hashing model using one or more stochastic gradient estimators.

Figure 12:
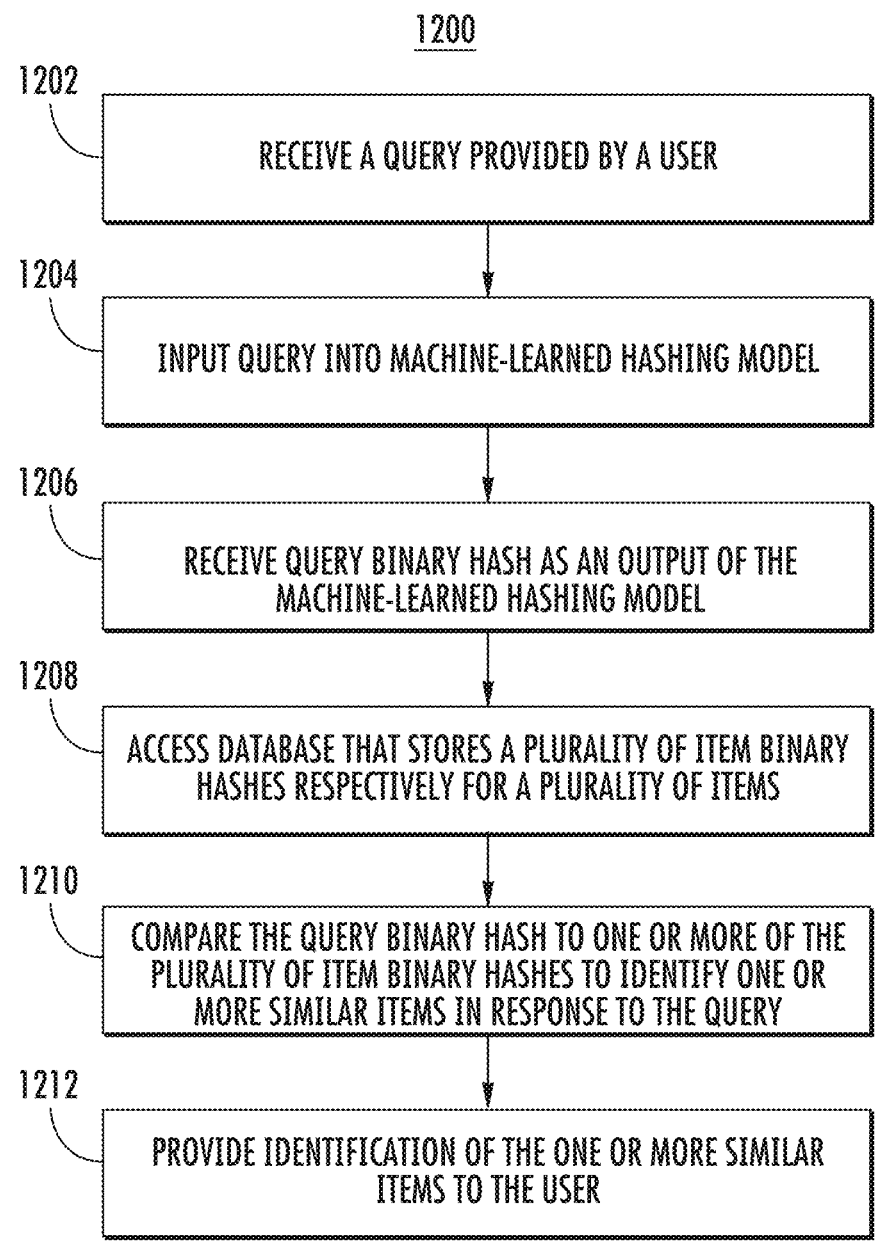
FIG. 12 depicts a flow chart diagram of an example method to identify search results through the use of a machine-learned hashing model according to example embodiments of the present disclosure.

FIG. 12 depicts a flow chart diagram of an example method 1200 to identify search results through the use of a machine-learned hashing model according to example embodiments of the present disclosure.

At 1202, a computing system receives a query provided by a user. For example, the query can be a text string, an image, an audio clip, or other items.

At 1204, the computing system inputs the query into a machine-learned hashing model. At 1206, the computing system receives a query binary hash as an output of the machine-learned hashing model.

At 1208, the computing system accesses a database that stores a plurality of item binary hashes respectively for a plurality of items. For example, each of the items can be a text string, an image, an audio clip, or other items.

At 1210, the computing system compares the query binary hash to one or more of the plurality of item binary hashes to identify one or more similar items in response to the query. For example, at 1210, the computing system can perform a Hamming search or one or more quantization-based techniques for the query binary hash relative to the plurality of item binary hashes to identify the one or more similar items in response to the query.

At 1212, the computing system provides identification of the one or more similar items to a user. For example, a search results page that identifies the one or more similar items can be provided for display to the user.

At 1212, the computing system provides identification of the one or more similar items to a user. For example, a search results page that identifies the one or more similar items can be provided for display to the user.

14. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 11-12 respectively depict steps performed in a particular order for purposes of illustration and discussion, the methods of the present disclosure are not limited to the particularly illustrated order or arrangement. The various steps of the methods 1100 and 1200 can be omitted, rearranged, combined, and/or adapted in various ways without deviating from the scope of the present disclosure.

What is claimed is:

1. A computer system for learning to produce compressed binary hashes comprising:
   a machine-learned hashing model configured to receive an input and, in response, output a binary hash for the input, wherein the binary hash comprises a compressed representation of the input, wherein the binary hash further comprises a binary value for each of a plurality of binary variables;
   a machine-learned generative model configured to receive the binary hash and, in response, output a reconstruction of the input;
   one or more processors; and
   one or more non-transitory computer-readable media that collectively store instructions that, when executed by the one or more processors, cause the computer system to perform operations, the operations comprising:
      obtaining the input;
      inputting the input into the machine-learned hashing model to receive the binary hash for the input;
      inputting the binary hash into the machine-learned generative model to receive the reconstruction of the input;
      evaluating an objective function based on at least one of the binary hash and the reconstruction of the input, wherein the objective function comprises a description length term that penalizes a description length of the binary hash; and
      training at least the machine-learned hashing model based at least in part on the objective function.

2. The computer system of claim 1, wherein the objective function does not include the plurality of binary variables as parameters.

3. The computer system of claim 1, wherein the objective function comprises a plurality of stochastic neurons that reparameterize the plurality of binary variables.

4. The computer system of claim 1, wherein training at least the machine-learned hashing model based at least in part on the objective function comprises performing distributional stochastic gradient descent to optimize the objective function.

5. The computer system of claim 1, wherein training at least the machine-learned hashing model based at least in part on the objective function comprises optimizing one or more distributions of the plurality of binary variables.

6. The computer system of claim 1, wherein training at least the machine-learned hashing model based at least in part on the objective function comprises backpropagating the objective function through the machine-learned hashing model using one or more stochastic gradient estimators.

7. The computer system of claim 1, wherein the machine-learned hashing model comprises a machine-learned linear projection model that generates a linear projection of the input.

8. The computer system of claim 7, wherein the machine-learned hashing model further comprises one or more machine-learned non-linear layers that receive the linear projection of the input and, in response, generate the binary hash for the input.

9. The computer system of claim 1, wherein the machine-learned hashing model comprises a machine-learned neural network.

10. The computer system of claim 1, wherein the machine-learned generative model comprises a machine-learned Gaussian model.

11. The computer system of claim 1, wherein the machine-learned generative model comprises a machine-learned restricted Markov Random Fields model.

12. The computer system of claim 1, wherein the machine-learned generative model comprises a machine-learned neural network.

13. The computer system of claim 1, wherein the operations further comprise:
   employing the machine-learned hashing model to generate a query binary hash for a query;
   performing a search for similar items by comparing the query binary hash to a plurality of item binary hashes.

14. A computer-implemented method for learning to produce compressed binary hashes, the method comprising:
   obtaining, by one or more computing devices, an input;
   inputting, by the one or more computing devices, the input into a machine-learned hashing model;
   receiving, by the one or more computing devices, a binary hash for the input as an output of the machine-learned hashing model, wherein the binary hash comprises a compressed representation of the input;
   inputting, by the one or more computing devices, the binary hash into a machine-learned generative model;
   receiving, by the one or more computing devices, a reconstruction of the input as an output of the machine-learned generative model;
   evaluating, by the one or more computing devices, an objective function based on at least one of the binary hash and the reconstruction of the input to obtain an objective value, wherein the objective function comprises a description length term that penalizes a description length of the binary hash; and
   adjusting, by the one or more computing devices, one or more parameters of the machine-learned hashing model to improve the objective value.

15. The computer-implemented method of claim 14, wherein the objective function comprises a plurality of stochastic neurons that reparameterize a plurality of binary variables.

16. The computer-implemented method of claim 14, wherein adjusting, by the one or more computing devices, one or more parameters of the machine-learned hashing model comprises performing, by the one or more computing devices, distributional stochastic gradient descent to optimize the objective function.

17. The computer-implemented method of claim 14, wherein adjusting, by the one or more computing devices, one or more parameters of the machine-learned hashing model comprises optimizing, by the one or more computing devices, one or more distributions of a plurality of binary variables.

18. The computer-implemented method of claim 14, wherein adjusting, by the one or more computing devices, one or more parameters of the machine-learned hashing model comprises backpropagating, by the one or more computing devices, the objective function through the machine-learned hashing model using one or more stochastic gradient estimators.

19. A computer system for learning to produce compressed binary hashes comprising:
   a machine-learned hashing model configured to receive an input and, in response, output a binary hash for the input, wherein the binary hash comprises a compressed representation of the input, wherein the binary hash further comprises a binary value for each of a plurality of binary variables, wherein the machine-learned hashing model has been trained based at least in part on an objective function that evaluates the binary hash or a reconstruction of the input provided by a machine-learned generative model in response to receipt of the binary hash, wherein the objective function comprises a description length term that penalizes a description length of the binary hash, and wherein the objective function further comprises a plurality of stochastic neurons that reparameterize the plurality of binary variables;
   one or more processors;
   a database that stores item binary hashes for a plurality of items;
   one or more non-transitory computer-readable media that collectively store instructions that, when executed by the one or more processors, cause the computer system to perform operations, the operations comprising:
      obtaining a query;
      inputting the query into the machine-learned hashing model;
      receiving a query binary hash as an output of the machine-learned hashing model; and
      identifying one or more similar items from the plurality of items based at least on part on a comparison of the query binary hash to one or more of the item binary hashes.

* * * * *